(12) United States Patent
Oswald et al.

(10) Patent No.: US 7,870,480 B1
(45) Date of Patent: Jan. 11, 2011

(54) METHODS AND APPARATUS FOR STORING AND RETRIEVING ANNOTATIONS ACCESSIBLE BY A PLURALITY OF REPORTS

(75) Inventors: William Oswald, Upper Montclair, NJ (US); Jason Chu, Newark, CA (US)

(73) Assignee: Actuate Corporation, South San Francisco, CA (US)

( * ) Notice: Subject to any disclaimer, the term of this patent is extended or adjusted under 35 U.S.C. 154(b) by 1521 days.

(21) Appl. No.: 11/080,078

(22) Filed: Mar. 14, 2005

(51) Int. Cl.
G06F 17/00 (2006.01)
(52) U.S. Cl. ........................ 715/231; 715/230
(58) Field of Classification Search .............. 715/200, 715/230, 231, 266, 272
See application file for complete search history.

(56) References Cited

U.S. PATENT DOCUMENTS

| | | | |
|---|---|---|---|
| 4,745,560 A | 5/1988 | Decker et al. | |
| 4,932,021 A | 6/1990 | Moody | |
| 5,272,767 A | 12/1993 | Asmuth et al. | |
| 5,448,691 A | 9/1995 | Motoyama | |
| 5,473,687 A | 12/1995 | Lipscomb et al. | |
| 5,621,889 A | 4/1997 | Lermuzeaux et al. | |
| 5,629,846 A | 5/1997 | Crapo | |
| 5,706,365 A | 1/1998 | Rangarajan et al. | |
| 5,724,581 A | 3/1998 | Kozakura | |
| 5,727,145 A | 3/1998 | Nessett et al. | |
| 5,826,268 A | 10/1998 | Schaefer et al. | |
| 5,845,304 A | 12/1998 | Iijima | |
| 5,884,035 A | 3/1999 | Butman et al. | |
| 6,014,666 A | 1/2000 | Helland et al. | |
| 6,148,379 A | 11/2000 | Schimmel | |
| 6,185,576 B1 | 2/2001 | McIntosh | |
| 6,205,452 B1 | 3/2001 | Warmus et al. | |
| 6,249,794 B1 | 6/2001 | Raman | |
| 6,260,044 B1 | 7/2001 | Nagral et al. | |
| 6,295,559 B1 | 9/2001 | Emens et al. | |
| 6,317,837 B1 | 11/2001 | Kenworthy | |
| 6,321,230 B1 | 11/2001 | Joslin et al. | |
| 6,332,146 B1 | 12/2001 | Jebens et al. | |
| 6,804,806 B1 * | 10/2004 | Bansal et al. ............... 715/201 |
| 6,859,805 B1 | 2/2005 | Rogers et al. | |
| 2001/0018708 A1 | 8/2001 | Shisler et al. | |

(Continued)

Primary Examiner—Stephen S Hong
Assistant Examiner—Gregory J Vaughn
(74) Attorney, Agent, or Firm—Weaver Austin Villeneuve & Sampson LLP

(57) ABSTRACT

Methods and apparatus for storing and retrieving annotations accessible by a plurality of reports are disclosed. When an annotation including comments entered by an author is received in association with a data element or field of one of the plurality of reports, the annotation is stored such that it is retrievable using a key. Specifically, the key is composed of both a scope of the annotation and a period end date of the annotation. The scope indicates a subject matter with which the annotation is associated. When annotations associated with a particular data element or field of a report are viewed, the scope of the annotation and the period end date of the data element or field are ascertained. A key composed of the scope and period end date is then used to retrieve the annotation(s) that are pertinent to the data element or field of the report. Specifically, since the reports are related in a hierarchical manner, the scope and period end date of the annotations that are retrieved are those within the scope and period end date of the data element or field of the report.

46 Claims, 33 Drawing Sheets

U.S. PATENT DOCUMENTS

| | | | |
|---|---|---|---|
| 2003/0018632 A1* | 1/2003 | Bays et al. | 707/3 |
| 2003/0145281 A1* | 7/2003 | Thames et al. | 715/513 |
| 2003/0145282 A1* | 7/2003 | Thomas et al. | 715/513 |
| 2003/0145310 A1* | 7/2003 | Thames et al. | 717/123 |
| 2004/0003132 A1* | 1/2004 | Stanley et al. | 709/316 |
| 2004/0088332 A1* | 5/2004 | Lee et al. | 707/200 |
| 2004/0260702 A1* | 12/2004 | Cragun et al. | 707/100 |
| 2004/0260714 A1* | 12/2004 | Chatterjee et al. | 707/101 |
| 2004/0260717 A1* | 12/2004 | Albornoz et al. | 707/102 |
| 2004/0267798 A1* | 12/2004 | Chatterjee et al. | 707/102 |
| 2008/0010365 A1* | 1/2008 | Schneider | 709/223 |

* cited by examiner

| XYZ Bank |||
| --- | --- | --- |
| Divisions | Business Units | Products |
| Corporate | HR | N/A |
| | Finance | |
| | Accounting | |
| Retail Banking | Consumer lending | • Debt consolidation<br>• Student loans<br>• Auto loans |
| | Debit / ATM cards | • XYZ airline debit card<br>• XYZ banking card |
| | Small business banking | • Credit card merchant services<br>• Business travel and credit card services |
| | Home loans | • Mortgage loans<br>• Equity loans<br>• Equity lines of credit |
| | Checking / savings accounts | • Standard Personal Checking<br>• Deluxe Personal Checking<br>• Standard Personal Savings<br>• Deluxe Personal Savings<br>• Overdraft Protection |
| Commercial banking | Commercial lending | • Commercial Loans<br>• Commercial Leases |
| | Cash management | • Lockbox Services<br>• Sweep Accounts<br>• Positive Pay Services |
| | Corporate investment and banking | • Cash management Trade & Treasury<br>• Global Equities<br>• Global Fixed Income |
| Card Services | Credit cards | • Everyday Visa Card<br>• Master Card<br>• Airline Rewards Cards |
| | Stored value cards | • Phone cards<br>• Coffee cards |
| | Merchant cards | • XYZ Gas Corp<br>• XYZ Department Store |
| Investment Management | Portfolio management | • Money Market Investments<br>• Investment Advisory Services<br>• Mutual Funds |
| | Insurance | • Life Insurance & Annuities<br>• Long Term Care |
| | Global securities | • Clearing<br>• Custody Services<br>• Depository Receipts |
| | Retirement planning | • Traditional IRA<br>• Roth IRA |

*FIG. 1*

Expenses Breakdown

In XYZ Bank, each business unit breaks down its expense accounts the same way:

Direct Operation Expenses
    Compensation
        Regular Salary
        Inventories
    Benefits
        Misc/other
        Non-qualified
        Qualified
        Chargeable
    Service & Administration
        Svc & Admin Fee
    Travel
        Operations
        Business
    Office
        Phones
        Books & Subscriptions
    Marketing & Sales
        Selling Expenses
        Advertising Expenses
        Misc.
Other Expenses
        Corporate Allocations
            Facilities
            HR
            Fin & Acctg

*FIG. 2*

XYZ Co.
Organization Summary by Division
(In USD)

| | Actual | Forecast | MTD Ending 30-Jun-04 Budget | Forecast Variance | FV% | Budget Variance | BV% | Actual | Forecast | YTD Ending 30-Jun Budget | Forc Vari |
|---|---|---|---|---|---|---|---|---|---|---|---|
| Revenue | $484,000.00 | $528,000.00 | $440,000.00 | ($44,000.00) | -8.33% | $44,000.00 | 10.00% | $968,000.00 | $1,056,000.00 | $880,000.00 | ($88,000) |
| Retail Banking | $110,000.00 | $120,000.00 | $100,000.00 | ($10,000.00) | -8.33% | $10,000.00 | 10.00% | $220,000.00 | $240,000.00 | $200,000.00 | ($20,000) |
| Commercial Banking | $66,000.00 | $72,000.00 | $60,000.00 | ($6,000.00) | -8.33% | $6,000.00 | 10.00% | $132,000.00 | $144,000.00 | $120,000.00 | ($12,000) |
| Card Services | $66,000.00 | $72,000.00 | $60,000.00 | ($6,000.00) | -8.33% | $6,000.00 | 10.00% | $132,000.00 | $144,000.00 | $120,000.00 | ($12,000) |
| Investment Management | $88,000.00 | $96,000.00 | $80,000.00 | ($8,000.00) | -8.33% | $8,000.00 | 10.00% | $176,000.00 | $192,000.00 | $160,000.00 | ($16,000) |
| Insurance | $88,000.00 | $96,000.00 | $80,000.00 | ($8,000.00) | -8.33% | $8,000.00 | 10.00% | $176,000.00 | $192,000.00 | $160,000.00 | ($16,000) |
| Brokerage | $66,000.00 | $72,000.00 | $60,000.00 | ($6,000.00) | -8.33% | $6,000.00 | 10.00% | $132,000.00 | $144,000.00 | $120,000.00 | ($12,000) |
| Expense | $154,000.00 | $176,000.00 | $140,800.00 | $22,000.00 | 12.50% | ($13,200.00) | -9.38% | $308,000.00 | $352,000.00 | $281,600.00 | $44,000 |
| Retail Banking | $35,000.00 | $40,000.00 | $32,000.00 | $5,000.00 | 12.50% | ($3,000.00) | -9.38% | $70,000.00 | $80,000.00 | $64,000.00 | $10,000 |
| Commercial Banking | $21,000.00 | $24,000.00 | $19,200.00 | $3,000.00 | 12.50% | ($1,800.00) | -9.38% | $42,000.00 | $48,000.00 | $38,400.00 | $6,000 |
| Card Services | $21,000.00 | $24,000.00 | $19,200.00 | $3,000.00 | 12.50% | ($1,800.00) | -9.38% | $42,000.00 | $48,000.00 | $38,400.00 | $6,000 |
| Investment Management | $28,000.00 | $32,000.00 | $25,600.00 | $4,000.00 | 12.50% | ($2,400.00) | -9.38% | $56,000.00 | $64,000.00 | $51,200.00 | $8,000 |
| Insurance | $28,000.00 | $32,000.00 | $25,600.00 | $4,000.00 | 12.50% | ($2,400.00) | -9.38% | $56,000.00 | $64,000.00 | $51,200.00 | $8,000 |
| Brokerage | $21,000.00 | $24,000.00 | $19,200.00 | $3,000.00 | 12.50% | ($1,800.00) | -9.38% | $42,000.00 | $48,000.00 | $38,400.00 | $6,000 |
| Gross Margin | $330,000.00 | $352,000.00 | $299,200.00 | ($22,000.00) | -6.25% | $30,800.00 | 10.29% | $660,000.00 | $704,000.00 | $598,400.00 | ($44,000) |
| Retail Banking | $75,000.00 | $80,000.00 | $68,000.00 | ($5,000.00) | -6.25% | $7,000.00 | 10.29% | $150,000.00 | $160,000.00 | $136,000.00 | ($10,000) |
| Commercial Banking | $45,000.00 | $48,000.00 | $40,800.00 | ($3,000.00) | -6.25% | $4,200.00 | 10.29% | $90,000.00 | $96,000.00 | $81,600.00 | ($6,000) |
| Card Services | $45,000.00 | $48,000.00 | $40,800.00 | ($3,000.00) | -6.25% | $4,200.00 | 10.29% | $90,000.00 | $96,000.00 | $81,600.00 | ($6,000) |
| Investment Management | $60,000.00 | $64,000.00 | $54,400.00 | ($4,000.00) | -6.25% | $5,600.00 | 10.29% | $120,000.00 | $128,000.00 | $108,800.00 | ($8,000) |
| Insurance | $60,000.00 | $64,000.00 | $54,400.00 | ($4,000.00) | -6.25% | $5,600.00 | 10.29% | $120,000.00 | $128,000.00 | $108,800.00 | ($8,000) |
| Brokerage | $45,000.00 | $48,000.00 | $40,800.00 | ($3,000.00) | -6.25% | $4,200.00 | 10.29% | $90,000.00 | $96,000.00 | $81,600.00 | ($6,000) |

*FIG. 3*

XYZ Co.
Commercial Banking Budget Variance
(In USD)

| | MTD Ending 30-Jun-04 | | | | | YTD Ending 30-Jan- | | | |
|---|---|---|---|---|---|---|---|---|---|
| | Actual | Forecast | Budget | Forecast Variance | FV% | Budget Variance | BV% | Actual | Forecast | Budget | For Vari |
| Commercial Banking | | | | | | | | | | | |
| Revenue | $66,000.00 | $72,000.00 | $60,000.00 | ($6,000.00) | -8.33% | $6,000.00 | 10.00% | $132,000.00 | $144,000.00 | $120,000.00 | ($12,00 |
| Expense | $21,000.00 | $24,000.00 | $19,200.00 | $3,000.00 | 12.50% | ($1,800.00) | -9.38% | $42,000.00 | $48,000.00 | $38,400.00 | $6,00 |
| Gross Margin | $45,000.00 | $48,000.00 | $40,800.00 | ($3,000.00) | -6.25% | $4,200.00 | 10.29% | $90,000.00 | $96,000.00 | $81,600.00 | ($6,00 |

Actual Expense as a % Revenue By Business Unit

Actual Gross Margin % By Business Unit

XYZ Co.
Commercial Lending Expense Detail
(In USD)

| | MTD Ending 30-Jun-04 | | | | | YTD Ending 30-Ju... | | | |
|---|---|---|---|---|---|---|---|---|---|
| | Actual | Forecast | Budget | Forecast Variance | FV% | Budget Variance | BV% | Actual | Forecast | Budget | Fo Va |
| Revenue | $22,000.00 | $24,000.00 | $20,000.00 | ($2,000.00) | -8.33% | $2,000.00 | 10.00% | $44,000.00 | $48,000.00 | $40,000.00 | (\$4,0 |
| Direct Operation Expenses | $5,600.00 | $6,400.00 | $5,120.00 | $800.00 | 12.50% | ($480.00) | -9.38% | $11,200.00 | $12,800.00 | $10,240.00 | $1, |
| Compensation | $700.00 | $800.00 | $640.00 | $100.00 | 12.50% | ($60.00) | -9.38% | $1,400.00 | $1,600.00 | $1,280.00 | $ |
| Regular Salary | $350.00 | $400.00 | $320.00 | $50.00 | 12.50% | ($30.00) | -9.38% | $700.00 | $800.00 | $640.00 | $ |
| Inventories | $350.00 | $400.00 | $320.00 | $50.00 | 12.50% | ($30.00) | -9.38% | $700.00 | $800.00 | $640.00 | $ |
| Benefits | $1,400.00 | $1,600.00 | $1,280.00 | $200.00 | 12.50% | ($120.00) | -9.38% | $2,800.00 | $3,200.00 | $2,560.00 | $ |
| Misc & Other | $350.00 | $400.00 | $320.00 | $50.00 | 12.50% | ($30.00) | -9.38% | $700.00 | $800.00 | $640.00 | $ |
| Non-qualified | $350.00 | $400.00 | $320.00 | $50.00 | 12.50% | ($30.00) | -9.38% | $700.00 | $800.00 | $640.00 | $ |
| Qualified | $350.00 | $400.00 | $320.00 | $50.00 | 12.50% | ($30.00) | -9.38% | $700.00 | $800.00 | $640.00 | $ |
| Chargeable | $350.00 | $400.00 | $320.00 | $50.00 | 12.50% | ($30.00) | -9.38% | $700.00 | $800.00 | $640.00 | $ |
| Service & Administration | $350.00 | $400.00 | $320.00 | $50.00 | 12.50% | ($30.00) | -9.38% | $700.00 | $800.00 | $640.00 | $ |
| Svc & Admin Fee | $350.00 | $400.00 | $320.00 | $50.00 | 12.50% | ($30.00) | -9.38% | $700.00 | $800.00 | $640.00 | $ |
| Travel | $700.00 | $800.00 | $640.00 | $100.00 | 12.50% | ($60.00) | -9.38% | $1,400.00 | $1,600.00 | $1,280.00 | $ |
| Operations | $350.00 | $400.00 | $320.00 | $50.00 | 12.50% | ($30.00) | -9.38% | $700.00 | $800.00 | $640.00 | $ |
| Business | $350.00 | $400.00 | $320.00 | $50.00 | 12.50% | ($30.00) | -9.38% | $700.00 | $800.00 | $640.00 | $ |
| Office | $700.00 | $800.00 | $640.00 | $100.00 | 12.50% | ($60.00) | -9.38% | $1,400.00 | $1,600.00 | $1,280.00 | $ |
| Phones | $350.00 | $400.00 | $320.00 | $50.00 | 12.50% | ($30.00) | -9.38% | $700.00 | $800.00 | $640.00 | $ |
| Books & Subscriptions | $350.00 | $400.00 | $320.00 | $50.00 | 12.50% | ($30.00) | -9.38% | $700.00 | $800.00 | $640.00 | $ |
| Marketing & Sales | $1,050.00 | $1,200.00 | $960.00 | $150.00 | 12.50% | ($90.00) | -9.38% | $2,100.00 | $2,400.00 | $1,920.00 | $ |
| Selling Expenses | $350.00 | $400.00 | $320.00 | $50.00 | 12.50% | ($30.00) | -9.38% | $700.00 | $800.00 | $640.00 | $ |
| Advertising Expenses | $350.00 | $400.00 | $320.00 | $50.00 | 12.50% | ($30.00) | -9.38% | $700.00 | $800.00 | $640.00 | $ |
| Misc. | $350.00 | $400.00 | $320.00 | $50.00 | 12.50% | ($30.00) | -9.38% | $700.00 | $800.00 | $640.00 | $ |

|  | Uses PLS? | • CEO<br>• CFO<br>• Financial Analysts | • Division VPs<br>• Financial Analysts | • Business Unit Managers<br>• Financial Analysts |
|---|---|---|---|---|
| Organization Summary | No | Y | N | N |
| Division Summary | Yes | Y | Y | N |
| Business Unit Summary | Yes | Y | Y | Y |
| Expense Detail | Yes | Y | Y | Y |
| Transaction Detail | No | Y | Y | Y |

Y – read, or secure read if there is PLS    N – neither read nor visible

| Forecast Variance | FV% | Budget Variance | BV% |
| --- | --- | --- | --- |
| -10,000.00 | -8.33% | 10,000.00 | 10.00% |
| 5,000.00 | 12.50% | -3,000.00 | -9.38% |
| -5,000.00 | -6.25% | 7,000.00 | 10.29% |

*FIG. 10*

ANNOTATIONS TABLE 1200

| Variance scope (e.g., Retail banking) 1202 | Period ending date 1204 | Identifier of individual generating the annotation 1206 | Annotation entry 1208 | Date and/or time 1210. |
|---|---|---|---|---|
| | | | | |
| | | | | |
| | | | | |
| | | | | |

*FIG. 12A*

| Annotations ||
|---|---|
| Column | Description |
| PED | E.g. 3/31/04, 4/30/04 |
| VarianceType | Forecast or Budget |
| Division | E.g. Retail Banking |
| BusinessUnit | E.g. Consumer Lending |
| AccountType | Revenue, Expenses, or Gross Margin |
| Account | E.g. "Direct Operating Expenses, Compensation, Salary" |
| UserID | Author of the comment |
| Comment | A text of maximum 256 characters |
| EntryDate | Date of entry creation |

XYZ Co.
Commercial Lending Expense Detail
(In USD)

| | Actual | Forecast | MTD Ending 30-Jun-04 Budget | Forecast Variance | FV% | Budget Variance | BV% | Actual | Forecast | YTD Ending 30-Jun Budget | |
|---|---|---|---|---|---|---|---|---|---|---|---|
| Revenue | $22,000.00 | $24,000.00 | $20,000.00 | ($2,000.00) | -8.33% | $2,000.00 | 10.00% | $44,000.00 | $48,000.00 | $40,000.00 | ($4,0 |
| Direct Operation Expenses | $5,600.00 | $6,400.00 | $5,120.00 | $800.00 | 12.50% | ($480.00) | -9.38% | $11,200.00 | $12,800.00 | $10,240.00 | $1, |
| Compensation | $700.00 | $800.00 | $640.00 | $100.00 | 12.50% | ($60.00) | -9.38% | $1,400.00 | $1,600.00 | $1,280.00 | $ |
| Regular Salary | $350.00 | $400.00 | $320.00 | $50.00 | 12.50% | ($30.00) | -9.38% | $700.00 | $800.00 | $640.00 | $ |
| Inventories | $350.00 | $400.00 | $320.00 | $50.00 | 12.50% | ($30.00) | -9.38% | $700.00 | $800.00 | $640.00 | $ |
| Benefits | $1,400.00 | $1,600.00 | $1,280.00 | $200.00 | 12.50% | ($120.00) | -9.38% | $2,800.00 | $3,200.00 | $2,560.00 | $ |
| Misc & Other | $350.00 | $400.00 | $320.00 | $50.00 | 12.50% | ($30.00) | -9.38% | $700.00 | $800.00 | $640.00 | $ |
| Non-qualified | $350.00 | $400.00 | $320.00 | $50.00 | 12.50% | ($30.00) | -9.38% | $700.00 | $800.00 | $640.00 | $ |
| Qualified | $350.00 | $400.00 | $320.00 | $50.00 | 12.50% | ($30.00) | -9.38% | $700.00 | $800.00 | $640.00 | $ |
| Chargeable | $350.00 | $400.00 | $320.00 | $50.00 | 12.50% | ($30.00) | -9.38% | $700.00 | $800.00 | $640.00 | $ |
| Service & Administration | $350.00 | $400.00 | $320.00 | $50.00 | 12.50% | ($30.00) | -9.38% | $700.00 | $800.00 | $640.00 | $ |
| Svc & Admin Fee | $350.00 | $400.00 | $320.00 | $50.00 | 12.50% | ($30.00) | -9.38% | $700.00 | $800.00 | $640.00 | $ |
| Travel | $700.00 | $800.00 | $640.00 | $100.00 | 12.50% | ($60.00) | -9.38% | $1,400.00 | $1,600.00 | $1,280.00 | $ |
| Operations | $350.00 | $400.00 | $320.00 | $50.00 | 12.50% | ($30.00) | -9.38% | $700.00 | $800.00 | $640.00 | $ |
| Business | $350.00 | $400.00 | $320.00 | $50.00 | 12.50% | ($30.00) | -9.38% | $700.00 | $800.00 | $640.00 | $ |
| Office | $700.00 | $800.00 | $640.00 | $100.00 | 12.50% | ($60.00) | -9.38% | $1,400.00 | $1,600.00 | $1,280.00 | $ |
| Phones | $350.00 | $400.00 | $320.00 | $50.00 | 12.50% | ($30.00) | -9.38% | $700.00 | $800.00 | $640.00 | $ |
| Books & Subscriptions | $350.00 | $400.00 | $320.00 | $50.00 | 12.50% | ($30.00) | -9.38% | $700.00 | $800.00 | $640.00 | $ |
| Marketing & Sales | $1,050.00 | $1,200.00 | $960.00 | $150.00 | 12.50% | ($90.00) | -9.38% | $2,100.00 | $2,400.00 | $1,920.00 | $ |
| Selling Expenses | $350.00 | $400.00 | $320.00 | $50.00 | 12.50% | ($30.00) | -9.38% | $700.00 | $800.00 | $640.00 | $ |
| Advertising Expenses | $350.00 | $400.00 | $320.00 | $50.00 | 12.50% | ($30.00) | -9.38% | $700.00 | $800.00 | $640.00 | $ |
| Misc. | $350.00 | $400.00 | $320.00 | $50.00 | 12.50% | ($30.00) | -9.38% | $700.00 | $800.00 | $640.00 | $ |

Commercial Banking / Commercial Lending
Direct Operation Expenses / Office / Phones MTD Ending 6/30/2004
Expense Forecast Variance = $50.00

Enter annotation (max. 255 chars):

[Submit] [Clear]

Previous and Supporting Annotation

Commercial Banking / Commercial Lending / Direct Operation Expenses / Office / Phones

| PED | Annotation | Submitter | Entry Date/Time |
|---|---|---|---|
| 6/30/2004 | Upgraded phone system last month. Cost savings realized this month. | Administrator | 9/9/2004 2:12:16 PM |

XYZ Co.
Commercial Lending Expense Detail
(In USD)

| | | MTD Ending 30-Jun-04 | | | | | | YTD Ending 30-Ju | |
|---|---|---|---|---|---|---|---|---|---|
| | Actual | Forecast | Budget | Forecast Variance | FV% | Budget Variance | BV% | Actual | Forecast | Budget | Fo Va |
| Revenue | $22,000.00 | $24,000.00 | $20,000.00 | ($2,000.00) | -8.33% | $2,000.00 | 10.00% | $44,000.00 | $48,000.00 | $40,000.00 | (54.0 |
| Direct Operation Expenses | $5,600.00 | $6,400.00 | $5,120.00 | ($800.00) | 12.40% | ($480.00) | -9.38% | $11,200.00 | $12,800.00 | $10,240.00 | $1, |
| Compensation | $700.00 | $800.00 | $640.00 | $100.00 | 12.50% | ($60.00) | -9.38% | $1,400.00 | $1,600.00 | $1,280.00 | $ |
| Regular Salary | $350.00 | $400.00 | $320.00 | $50.00 | 12.50% | ($30.00) | -9.38% | $700.00 | $800.00 | $640.00 | $ |
| Inventories | $350.00 | $400.00 | $320.00 | $50.00 | 12.50% | ($30.00) | -9.38% | $700.00 | $800.00 | $640.00 | $ |
| Benefits | $1,400.00 | $1,600.00 | $1,280.00 | $200.00 | 12.50% | ($120.00) | -9.38% | $2,800.00 | $3,200.00 | $2,560.00 | $ |
| Misc & Other | $350.00 | $400.00 | $320.00 | $50.00 | 12.50% | ($30.00) | -9.38% | $700.00 | $800.00 | $640.00 | $ |
| Non-qualified | $350.00 | $400.00 | $320.00 | $50.00 | 12.50% | ($30.00) | -9.38% | $700.00 | $800.00 | $640.00 | $ |
| Qualified | $350.00 | $400.00 | $320.00 | $50.00 | 12.50% | ($30.00) | -9.38% | $700.00 | $800.00 | $640.00 | $ |
| Chargeable | $350.00 | $400.00 | $320.00 | $50.00 | 12.50% | ($30.00) | -9.38% | $700.00 | $800.00 | $640.00 | $ |
| Service & Administration | $350.00 | $400.00 | $320.00 | $50.00 | 12.50% | ($30.00) | -9.38% | $700.00 | $800.00 | $640.00 | $ |
| Svc & Admin Fee | $350.00 | $400.00 | $320.00 | $50.00 | 12.50% | ($30.00) | -9.38% | $700.00 | $800.00 | $640.00 | $ |
| Travel | $700.00 | $800.00 | $640.00 | $100.00 | 12.50% | ($60.00) | -9.38% | $1,400.00 | $1,600.00 | $1,280.00 | $ |
| Operations | $350.00 | $400.00 | $320.00 | $50.00 | 12.50% | ($30.00) | -9.38% | $700.00 | $800.00 | $640.00 | $ |
| Business | $350.00 | $400.00 | $320.00 | $50.00 | 12.50% | ($30.00) | -9.38% | $700.00 | $800.00 | $640.00 | $ |
| Office | $700.00 | $800.00 | $640.00 | $100.00 | 12.50% | ($60.00) | -9.38% | $1,400.00 | $1,600.00 | $1,280.00 | $ |
| Phones | $350.00 | $400.00 | $320.00 | $50.00 | 12.50% | ($30.00) | -9.38% | $700.00 | $800.00 | $640.00 | $ |
| Books & Subscriptions | $350.00 | $400.00 | $320.00 | $50.00 | 12.50% | ($30.00) | -9.38% | $700.00 | $800.00 | $640.00 | $ |
| Marketing & Sales | $1,050.00 | $1,200.00 | $960.00 | $150.00 | 12.40% | ($90.00) | -9.38% | $2,100.00 | $2,400.00 | $1,920.00 | $ |
| Selling Expenses | $350.00 | $400.00 | $320.00 | $50.00 | 12.50% | ($30.00) | -9.38% | $700.00 | $800.00 | $640.00 | $ |
| Advertising Expenses | $350.00 | $400.00 | $320.00 | $50.00 | 12.50% | ($30.00) | -9.38% | $700.00 | $800.00 | $640.00 | $ |
| Misc. | $350.00 | $400.00 | $320.00 | $50.00 | 12.50% | ($30.00) | -9.38% | $700.00 | $800.00 | $640.00 | $ |

*FIG. 22*

Commercial Banking / Commercial Lending
Direct Operation Expenses / Office / Phones MTD Ending 6/30/2004
Expense Budget Variance = ($30.00)

Enter annotation (max. 255 chars):

[ Submit ] [ Clear ]

Previous and Supporting Annotation

Commercial Banking / Commercial Lending / Direct Operation Expenses / Office / Phones

| PED | Annotation | Submitter | Entry Date/Time |
|---|---|---|---|
| 6/30/2004 | Cost of phone system upgrade was not part of original budget. Forcast numbers do reflect costs associated with the upgrade. | Administrator | 9/9/2004 2:16:52 PM |

*FIG. 23*

XYZ Co.
Commercial Lending Budget Variance
(In USD)

| | MTD Ending 30-Jun-04 | | | | | YTD Ending 30-Jun | | | |
|---|---|---|---|---|---|---|---|---|---|
| | Actual | Forecast | Budget | Forecast Variance | FV% | Budget Variance | BV% | Actual | Forecast | Budget | For Vari |

| | Actual | Forecast | Budget | Forecast Variance | FV% | Budget Variance | BV% | Actual | Forecast | Budget | For Vari |
|---|---|---|---|---|---|---|---|---|---|---|---|
| Commercial Lending | | | | | | | | | | | |
| Revenue | $22,000.00 | $24,000.00 | $20,000.00 | ($2,000.00) | -8.33% | $2,000.00 | 10.00% | $44,000.00 | $48,000.00 | $40,000.00 | ($4,000) |
| Expense | $7,000.00 | $8,000.00 | $6,400.00 | $1,000.00 | 12.50% | ($600.00) | -9.38% | $14,000.00 | $16,000.00 | $12,800.00 | $2,00 |
| Gross Margin | $15,000.00 | $16,000.00 | $13,600.00 | ($1,000.00) | -6.25% | $1,400.00 | 10.29% | $30,000.00 | $32,000.00 | $27,200.00 | ($2,001) |

*FIG. 24*

Commercial Banking / Commercial Lending

MTD Ending 6/30/2004

Expense Forecast Variance = $1,000.00

Enter annotation (max. 255 chars):

[ Submit ]  [ Clear ]

Previous and Supporting Annotation

Commercial Banking / Commercial Lending / Direct Operation Expenses / Office / Phones

| PED | Annotation | Submitter | Entry Date / Time |
|---|---|---|---|
| 6/30/2004 | Upgraded phone system last month. Cost savings realized this month. | Administrator | 9/9/2004 2:12:16 PM |

Commercial Banking / Commercial Lending / Direct Operation Expenses / Travel / Operations

| PED | Annotation | Submitter | Entry Date / Time |
|---|---|---|---|
| 6/30/2004 | Travel costs will hit next month | Administrator | 8/13/2004 1:57:15 PM |

*FIG. 25*

Commercial Banking / Commercial Lending

MTD Ending 6/30/2004
Expense Budget Variance = ($600.00)

Enter annotation (max. 255 chars):

[ Submit ] [ Clear ]

Previous and Supporting Annotation

Commercial Banking / Commercial Lending / Direct Operation Expenses / Office / Phones

| PED | Annotation | Submitter | Entry Date/Time |
|---|---|---|---|
| 6/30/2004 | Cost of phone system upgrade was not part of original budget. Forcast numbers do reflect costs associated with the upgrade. | Administrator | 9/9/2004 2:16:52 PM |

Commercial Banking

MTD Ending 6/30/2004
Expense Forecast Variance = $3,000.00

Enter annotation (max. 255 chars):

[ Submit ] [ Clear ]

Previous and Supporting Annotation

Commercial Banking

| PEO | Annotation | Submitter | Entry Date/Time |
|---|---|---|---|
| 6/30/2004 | This is another test... | Administrator | 6/22/2004 5:43:35 PM |

Commercial Banking / Commercial Lending / Direct Operation Expenses / Office / Phones

| PEO | Annotation | Submitter | Entry Date/Time |
|---|---|---|---|
| 6/30/2004 | Upgraded phone system last month. Cost savings realized this month. | Administrator | 9/9/2004 2:12:16 PM |

Commercial Banking / Commercial Lending / Direct Operation Expenses / Travel / Operations

| PEO | Annotation | Submitter | Entry Date/Time |
|---|---|---|---|
| 6/30/2004 | Travel costs will hit next month | Administrator | 8/13/2004 1:57:15 PM |

*FIG. 28*

Commercial Banking

MTD Ending 6/30/2004

Expense Budget Variance = ($1,800.00)

Enter annotation (max. 255 chars):

[Submit] [Clear]

Previous and Supporting Annotation

Commercial Banking / Commercial Lending / Direct Operation Expenses / Office / Phones

| PEQ | Annotation | Submitter | Entry Date / Time |
|---|---|---|---|
| 6/30/2004 | Cost of phone system upgrade was not part of original budget. Forcast numbers do reflect costs associated with the upgrade. | Administrator | 9/9/2004 2:16:52 PM |

Commercial Banking

MTD Ending 6/30/2004
Expense Forecast Variance = $3,000.00

Enter annotation (max. 255 chars):

[ Submit ] [ Clear ]

Previous and Supporting Annotation

Commercial Banking

| PEO | Annotation | | Submitter | Entry Date/Time |
|---|---|---|---|---|
| 6/30/2004 | This is another test... | | Administrator | 6/22/2004 5:43:35 PM |

Commercial Banking / Commercial Lending / Direct Operation Expenses / Office / Phones

| PEO | Annotation | | Submitter | Entry Date/Time |
|---|---|---|---|---|
| 6/30/2004 | Upgraded phone system last month. Cost savings realized this month. | | Administrator | 9/9/2004 2:12:16 PM |

Commercial Banking / Commercial Lending / Direct Operation Expenses / Travel / Operations

| PEO | Annotation | | Submitter | Entry Date/Time |
|---|---|---|---|---|
| 6/30/2004 | Travel costs will hit next month | | Administrator | 8/13/2004 1:57:15 PM |

*FIG. 31*

Commercial Banking

MTD Ending 6/30/2004
Expense Budget Variance = ($1,800.00)

Enter annotation (max. 255 chars):

[Submit] [Clear]

Previous and Supporting Annotation

Commercial Banking / Commercial Lending / Direct Operation Expenses / Office / Phones

| PED | Annotation | Submitter | Entry Date / Time |
|---|---|---|---|
| 6/30/2004 | Cost of phone system upgrade was not part of original budget. Forcast numbers do reflect costs associated with the upgrade. | Administrator | 9/9/2004 2:16:52 PM |

*FIG. 32*

METHODS AND APPARATUS FOR STORING AND RETRIEVING ANNOTATIONS ACCESSIBLE BY A PLURALITY OF REPORTS

BACKGROUND OF THE INVENTION

The present invention relates to computer-implemented systems and methods for storing and retrieving annotations. More particularly, the present invention relates to storing and retrieving annotations accessible by a plurality of reports.

Data maintained by many companies is often distributed across disparate systems. As a result, data that is provided to one business unit may not be accessible by another business unit. Even if data is stored in a consolidated manner, that data is not necessarily provided to all individuals who have access privileges to that data and who could benefit from that data.

Many reporting tools are available to companies today. Often, such reporting tools enable managers or other supervisory employees to add comments (i.e., "annotations") to a report. For instance, a business manager may wish to provide reasons for a particular shipment delay. When the report is later accessed, those comments are viewed along with the data displayed in the report.

Unfortunately, once comments have been entered in association with one report, those comments generally cannot be accessed via another report being viewed. This is true even where the comments may be relevant to the report being viewed. One example in which this often occurs is with respect to variances. Two types of variances often provided in reports are budget variances and forecast variances. A budget variance is the variance between a budget amount and an actual amount, while a forecast variance is the variance between a forecast amount and a budget amount.

When a business manager or other individual monitors the spending and revenue of a particular company or unit within the company, they may enter comments explaining a variance such as a budget or forecast variance. For instance, the business manager may provide reasons for a particular budget variance. Unfortunately, even where these comments may be helpful to another business manager in another unit within the company that may be affected by the particular budget variance, these comments are typically only accessible via the report in which they were generated. In other words, another business manager viewing a report applicable to his or her group within the company will not be able to view the comments entered within another report that is also relevant to that same group within the company.

In view of the above, it would be beneficial if comments entered in association with one report could be viewed via other reports to which the comments are considered to be pertinent.

SUMMARY OF THE INVENTION

Methods and apparatus are disclosed for storing and retrieving annotations accessible by a plurality of reports. This is accomplished, in part, by storing each annotation such that it is associated with a key rather than a single report. In this manner, the annotations may be accessible by multiple reports.

In accordance with one aspect of the invention, when an annotation including comments entered by an author is obtained in association with a data element or field of one of the plurality of reports, the annotation is stored such that it is retrievable using a key. Specifically, the key is composed of both a scope of the annotation and a period end date of the annotation. The scope indicates a subject matter with which the annotation is associated. The scope and period end date that are associated with the annotation may be the scope and period end date of the pertinent data element or field via which the annotation was obtained. Alternatively, the scope and period end date that are associated with the annotation may be the scope and period end date of the report via which the annotation was obtained.

In accordance with one embodiment, when an annotation is received in association with a variance of one of a plurality of reports, the annotation is stored. Specifically, the stored annotation is associated with a scope of the variance and a period end date of the variance, where the scope of the variance indicates a subject matter with which the variance is associated. Both the scope and the period end date are used together as a key for accessing the annotation for one of the plurality of reports having a variance with a scope that is greater than or equal to the scope of the annotation and a subject matter that includes the subject matter of the variance.

In accordance with another aspect of the invention, when annotations associated with a particular data element or field of a report are viewed, the scope of the annotation and the period end date of the data element or field are ascertained. A key composed of the scope and period end date is then used to retrieve the annotation(s) that are pertinent to the data element or field of the report. Specifically, since the reports are related in a hierarchical manner, the scope and period end date of the annotations that are retrieved are those within the scope and period end date of the data element or field of the report.

In accordance with one embodiment of the invention, a method of viewing annotations in association with a field of one of a plurality of reports is performed when a request to view one of the plurality of reports or a request to view annotations in association with a field of one of the plurality of reports is received. One or more annotations are then identified, where a scope of the field of the one of the plurality of reports is equal to or greater than the scope of the identified annotations and wherein a period end date of the field of the one of the plurality of reports is later than or equal to the period end date of the identified annotations. The identified annotations are then displayed, wherein the scope of the field of the one of the plurality of reports is equal to or greater than the scope of the identified annotations and wherein the period end date of the field of the one of the plurality of reports is later than or equal to the period end date of the identified annotations.

These and other features of the present invention will be presented in more detail in the following detailed description of the invention and the associated figures.

BRIEF DESCRIPTION OF THE DRAWINGS

FIG. 1 is a chart illustrating an exemplary division and business unit breakdown for a financial services organization.

FIG. 2 is a diagram illustrating an exemplary expense breakdown for each business unit.

FIG. 3 is an exemplary Organization Summary Report.

FIG. 4 is an exemplary Division Summary Report.

FIG. 6 is an exemplary Expense Detail Summary Report.

FIG. 10 is a diagram illustrating comment indicators in accordance with one embodiment of the invention.

FIG. 12A is an exemplary Annotations Table in which annotations may be stored.

FIG. 12C is a diagram illustrating an Annotations Table in which the variance scope is represented via multiple fields.

Figure 14:
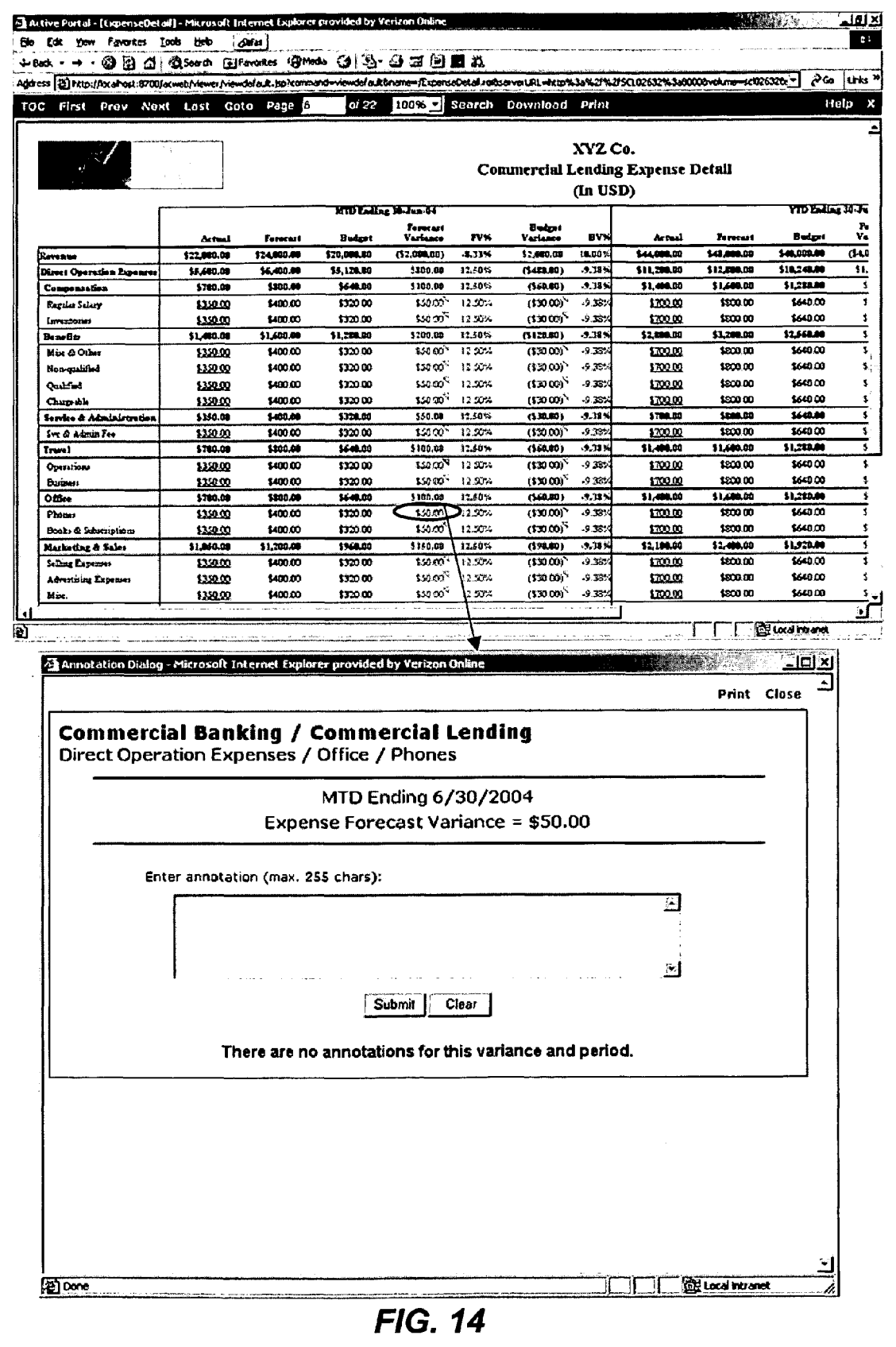

FIG. 14 illustrates an exemplary Expense Detail Report.

FIG. 15 is a dialog box including an input form enabling a user to enter a new annotation.

FIG. 17 illustrates the Expense Detail Report of FIG. 14 after the new annotation entered in FIG. 15 has been saved.

FIG. 18 is an annotation dialog box including an input form that is presented when a user clicks on the comment indicator that has been set after the new annotation entered in FIG. 15 has been entered.

FIG. 20 is a diagram illustrating the result of a user inputting text into a dialog box presented when the user clicks on the comment indicator of FIG. 19 prior to clicking "Submit."

FIG. 22 is a diagram illustrating a comment indicator that has been set once a newly entered annotation has been saved.

FIG. 23 is a diagram illustrating an annotation dialog box presented when the user clicks on the comment indicator that was previously set.

FIG. 24 is a diagram illustrating a Business Unit Summary Report.

FIG. 25 is a diagram illustrating an annotation dialog input box that is presented when the user clicks on the comment indicator associated with the Expense Forecast Variance Field of the Business Unit Summary Report of FIG. 24.

FIG. 26 is a diagram illustrating an annotation dialog input box that is presented when the user clicks on the comment indicator associated with the Expense Budget Variance field of the Business Unit Summary Report of FIG. 24.

FIG. 27 is a screen shot illustrating a Division Summary Report.

FIG. 28 is a dialog box that is presented when the user clicks on the comment indicator associated with the Expense Forecast Variance field.

FIG. 29 is a dialog box that is presented when the user clicks on the comment indicator associated with the Expense Budget Variance field.

FIG. 30 illustrates an Organization Summary Report.

FIG. 31 is a dialog box that is presented when the user clicks on the comment indicator associated with the Forecast Variance field of the Expense account of the Commercial Banking Division as shown in FIG. 30.

FIG. 32 is a dialog box that is presented when the user clicks on the comment indicator associated with the Budget Variance field of the Expense account of the Commercial Banking Division as shown in FIG. 30.

DESCRIPTION OF THE PREFERRED EMBODIMENTS

Figure 5:
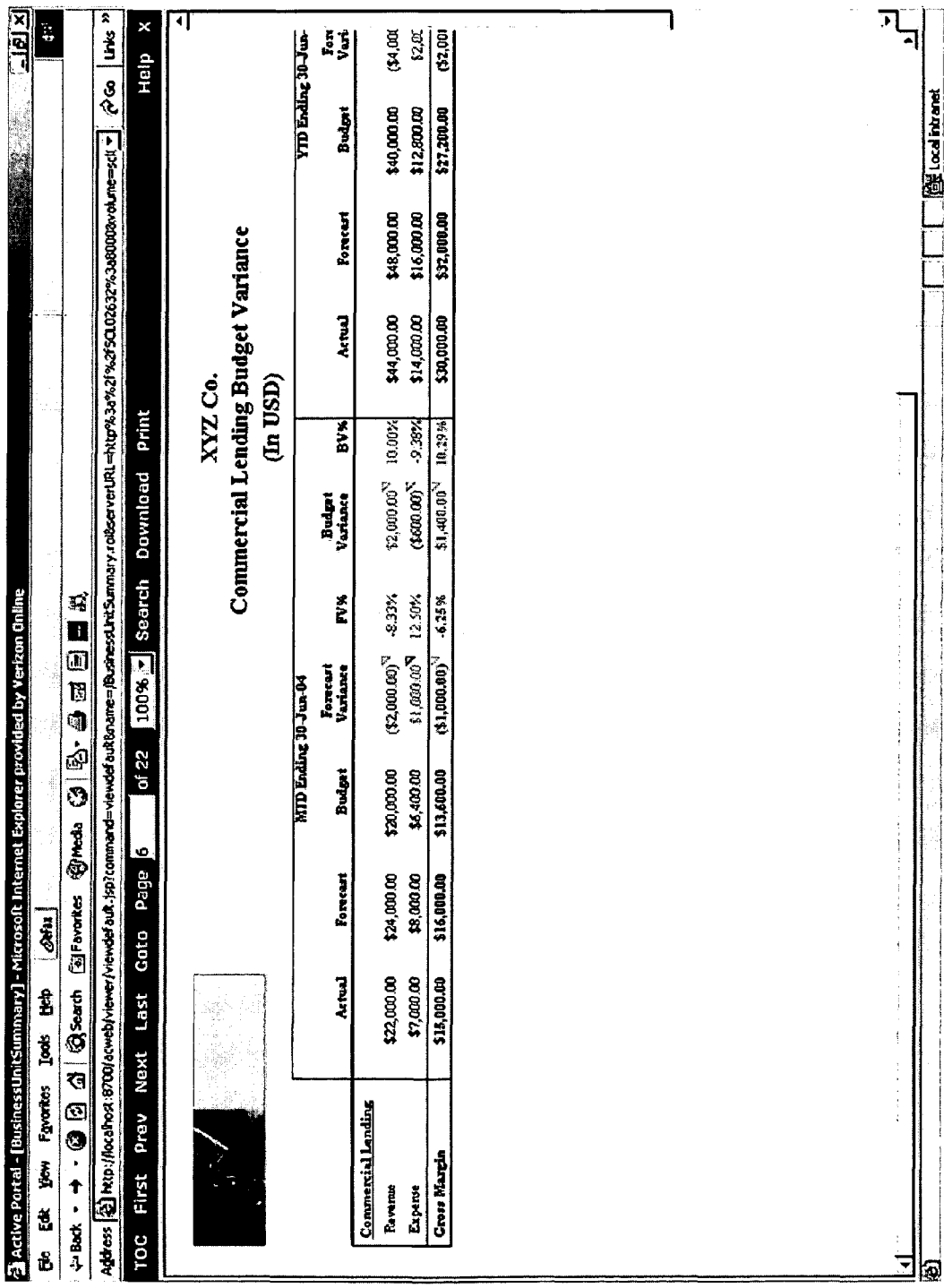
FIG. 5 is an exemplary Business Unit Summary Report.

Embodiments of the invention enable annotations (i.e., comments) to be added to fields of reports. These fields may, for example, be variance fields indicating a budget or forecast variance. Once generated, the annotations are stored such that the annotations can be accessed by multiple reports. Specifically, in accordance with one embodiment, the annotations are stored independently from any one report. Instead, the annotations are stored such that they are accessible via a key that identifies annotations that are pertinent to a particular field or data element. In accordance with one embodiment, the key includes or is associated with a period end date and a scope of the field (or data element). The period end date and scope of the field (or data element) may be the same or different than the period end date and scope of the report including that field (or data element). Using the key, any annotations that fall within both the period end date and the scope of the field (or data element) for which annotations are viewed are presented to the user.

In accordance with one embodiment, the scope of a particular field (e.g., variance field) and therefore the scope of a particular variance (i.e., variance scope) may be determined from the type of the field (e.g., budget or forecast) or the type of the account, as well as the segments of the company (or accounts) to which the variance pertains.

In the following description, an exemplary organizational model will be described. This organizational model may be applied to companies such as financial services companies or other types of companies. In fact, the exemplary organizational model may be applied to track and maintain annotations in association with a particular data element or field (e.g., variance). Of course, the organizational model described in further detail below is merely illustrative, and other organizational models may be applied to track and maintain annotations such that they can be accessed by multiple reports.

In accordance with one embodiment, the organizational model is organized such that an organization includes multiple divisions. Each division includes one or more business units. Each business unit has an associated list of one or more expense accounts. An expense account is associated with a history of transactions.

Various functional roles may be implemented with an organization. Each employee having a particular role within the organization will therefore typically have access rights enabling that employee access (e.g., read access and/or write access) to data pertaining to specific segments of the organization. In this example, both a Chief Executive Officer (CEO) and Chief Financial Officer (CFO) have the right to view all data in an organization, even though they often view variances at an organization or a division level only. Division Vice Presidents (VPs) have the right to view data for their own divisions and the business units beneath them. They cannot view data for other divisions or the organization as a whole. Business Unit Managers can view data for their own business units, but cannot view data at a division or organizational level. Depending upon which level the Financial Analysts belong to, they can view variance numbers at different levels. For example, a CFO may have several financial analysts assisting him, and they may therefore have the same right as the CFO to view any data in the organization.

FIG. 1 is a chart illustrating an exemplary division and business unit breakdown for a financial services organization. Specifically, in this example, the organization is a bank. The bank is made up five divisions: Corporate, Retail Banking, Commercial Banking, Card Services, and Investment Management. Each division is composed of several business units, and each business unit provides several service products.

Each business unit within a division may break down its expense accounts in a variety of ways. In this example, each business unit breaks down its expense accounts the same way. FIG. 2 is a diagram illustrating an exemplary expense breakdown for each business unit. Specifically, Direct Operation Expenses fall into the category of Compensation, Benefits, Service & Administration, Travel, Office, or Marketing & Sales. Other Expenses may include, for example, Corporate Allocations.

Various reports may be generated for a particular organization. In order to generate these reports, a report template may be created for generating each report. Five exemplary reports will be described in further detail below with reference to FIGS. 3-7.

FIG. 3 is an exemplary Organization Summary Report. The Organization Summary Report is the highest-level report that presents budget variance information at the organizational level. Specifically, for a period end date (e.g., month or year), Revenue, Expense, and Gross Margin numbers are presented. Within these categories, each division is listed. In the columns, the actual, forecast, and budget amounts are presented, along with the forecast variance, forecast variance percentage, budget variance, and budget variance percentage.

FIG. 4 is an exemplary Division Summary Report. The Division Summary Report is the next level report that presents budget variance information at the divisional level. Specifically, the same columns presented in the Organization Summary Report are present in the Division Summary Report for each period end date (e.g., month and year). However, these numbers are only presented for a single division.

FIG. 5 is an exemplary Business Unit Summary Report. The Business Unit Summary Report is the next level report that presents budget variance information at the business level. Specifically, the same columns presented in both the Organization Summary Report and the Division Summary Report are present in the Business Unit Report for each period end date (e.g., month and year). However, these numbers are only presented for a single business unit.

FIG. 6 is an exemplary Expense Detail Summary Report. The Expense Detail Summary Report is the next level report that presents budget variance information at the expense detail level. Again, the same columns described above are presented for each period end date (e.g., month and year). These numbers are presented for each expense account set forth above with reference to FIG. 2.

Figure 7:
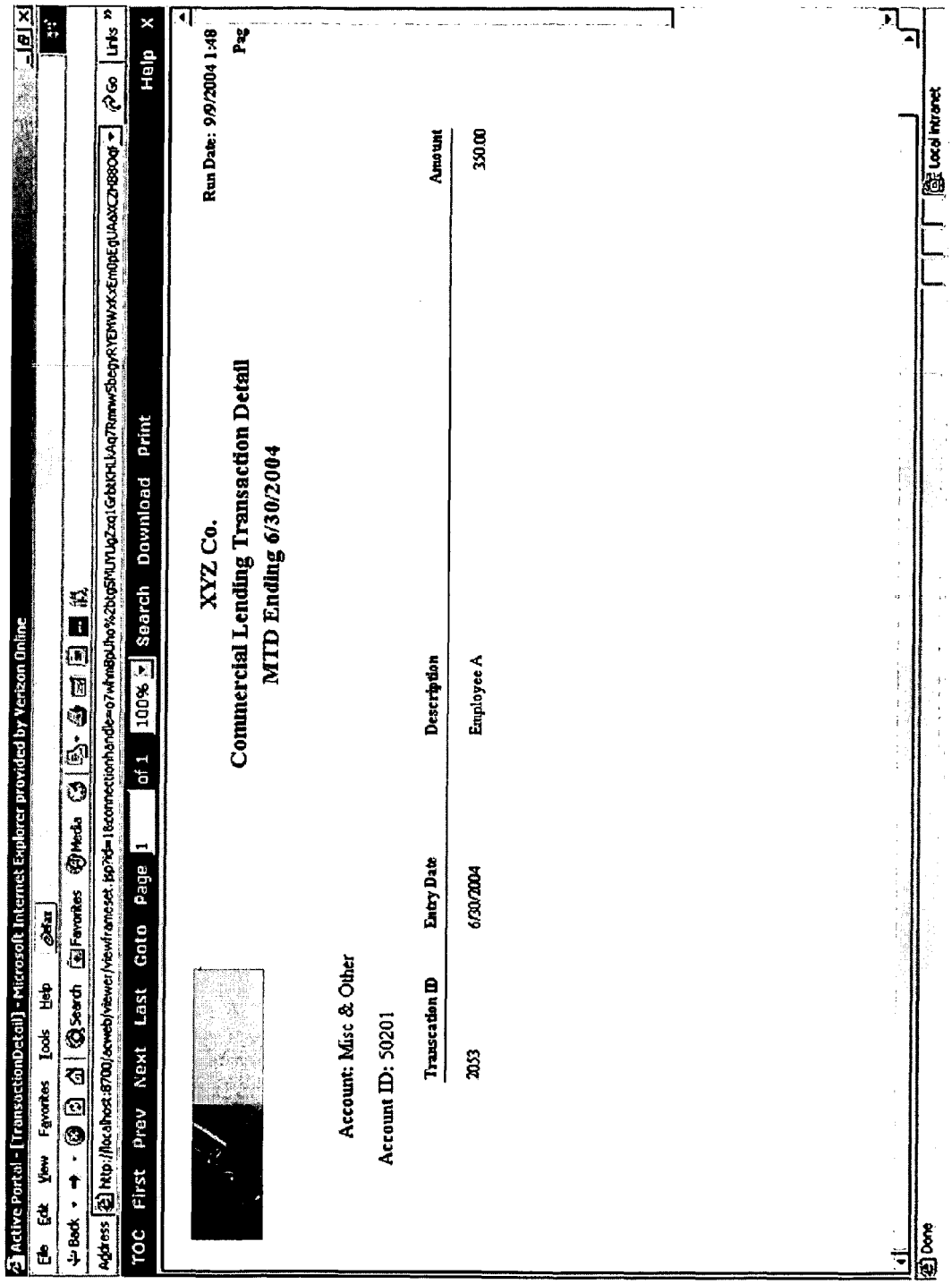
FIG. 7 is an exemplary Transaction Detail Report.

FIG. 7 is an exemplary Transaction Detail Report. The Transaction Detail Report is the lowest level report that displays transaction detail at the most granular level. Specifically, the details of a single transaction are displayed. In this example, the transaction relates to Commercial Lending and is associated with the Misc & Other account, identified by the Account ID 50201. In addition, a Transaction ID, Entry Date, Description, and Amount is set forth for the particular transaction. Thus, the Transaction Detail Report displays transactions for one expense account for one business unit only.

Figures 8, 9:
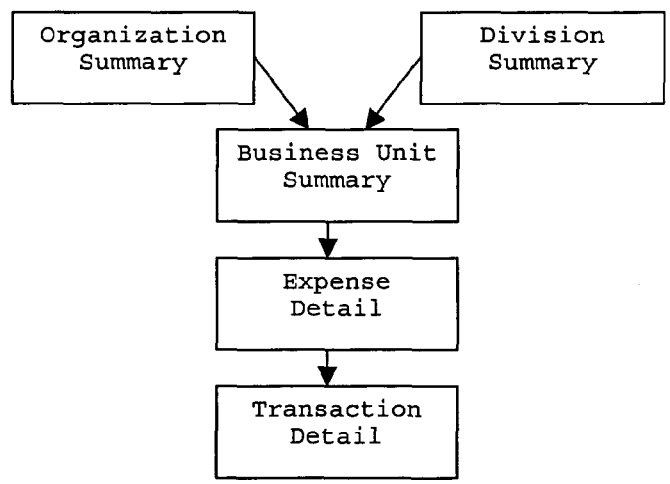
FIG. 8 is a diagram illustrating a hierarchical flow-diagram representing an order in which a user may "drill down" from a higher level report such as an Organization Summary or Division Summary report to a lower level report such as a Business Unit Summary, Expense Detail, or Transaction Detail report.
FIG. 9 is a chart illustrating one mechanism for enforcing role-based security in order to provide read access to the reports described with reference to FIGS. 3-7.

As set forth above, the reports are related in a hierarchical manner. In order to navigate the reports, it is possible to "drill-down" from a higher-level report to a lower level report. FIG. 8 is a diagram illustrating a hierarchical flow-diagram representing an order in which a user may "drill down" from a higher level report such as an Organization Summary or Division Summary report to a lower level report such as a Business Unit Summary, Expense Detail, or Transaction Detail report. The user may also drill down from any report to a lower level report. For instance, a user may drill down from an Expense Detail report or Business Unit Summary report to a Transaction Detail report. As another example, a user may drill down from a Business Unit Summary report to an Expense Detail report.

In accordance with one embodiment, "drill-down" may be accomplished by clicking on a business unit name on the left of a report to drill down to the report for that business unit. While it is possible to "drill-down" from one report to another report, access to reports such as those described above with reference to FIGS. 3-7 may be enforced by role-based and/or page-level security. In particular, page-level security supports controlling access to a report page at the user level. In a report that implements page-level security, a user can view, search, and print only pages to which he or she has access or pages to which page level-security does not apply. Using page-level security, a single report file may be created that displays different subsets of pages to different report users. Methods of implementing role security and page-level security are described in U.S. Pat. No. 6,859,805, entitled "Methods and Apparatus for Generating Page-Level Security in a Computer Generated Report," Rogers et al, which is incorporated herein by reference for all purposes.

FIG. 9 is a chart illustrating one mechanism for enforcing role-based security in order to provide read access to the reports described above with reference to FIGS. 3-7. In this example, the CEO, CFO, and their financial analysts have full access to all reports. Division VPs and their financial analysts have access to the Division Summary Report and can drill down from that report to the other lower level reports, but cannot access the access data belonging to their division. Business Unit Managers and their financial analysts have access to the Business Unit Summary and all lower level reports, but cannot access the Division Summary or Organization Summary reports. Again, page-level security may be used to ensure that users only access data belonging to their business unit.

Once a particular report has been accessed, the user may then access annotations associated with a particular field. In accordance with one embodiment, the presence of annotations associated with a particular field is indicated to the user by a comment indicator.

FIG. 10 is a diagram illustrating comment indicators in accordance with one embodiment of the invention. A comment indicator is a visual indicator used to indicate to the user the presence of annotations for a particular variance. In this example, a comment indicator is presented in association with a forecast variance and a budget variance. In this example, the comment indicator is a triangle. Specifically, the triangle is filled in when there are annotations that are associated with the corresponding variance field (and corresponding value), and the triangle is not filled in when there are no annotations associated with the variance field (and corresponding value). For instance, the comment indicator may be displayed as a yellow triangle when annotations are present, and as a gray-out empty triangle when there are no annotations.

Figure 11:
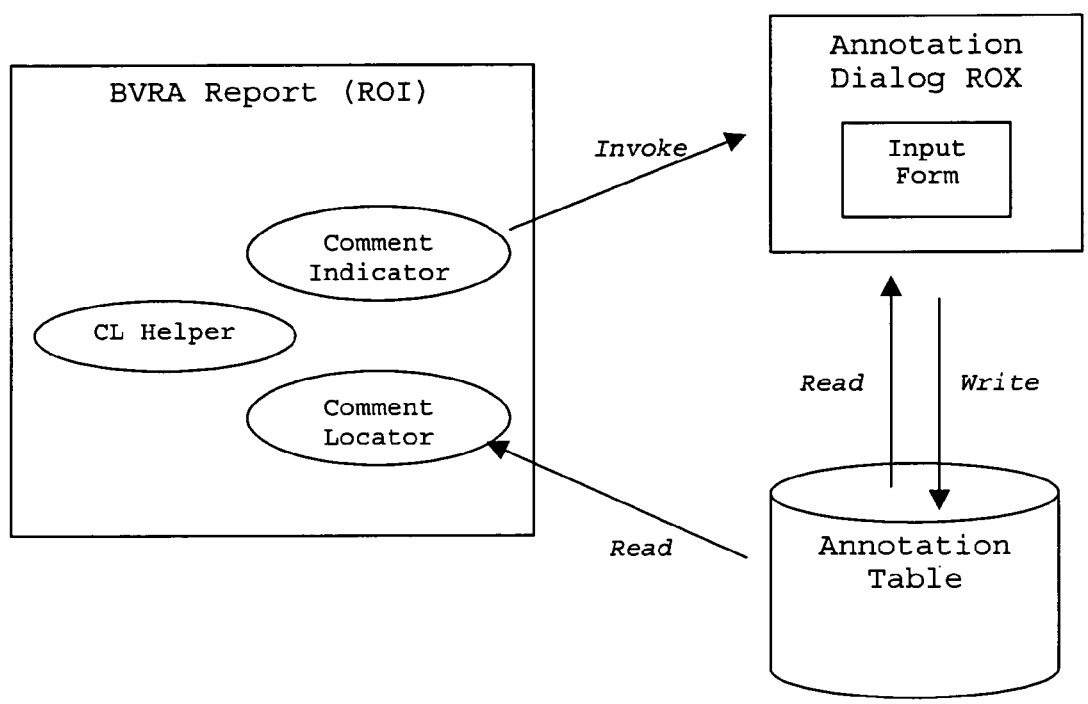
FIG. 11 is a block diagram illustrating a Report Annotation Architecture in accordance with one embodiment of the invention.

FIG. 11 is a block diagram illustrating a Report Annotation Architecture in accordance with one embodiment of the invention. In a report 1102, a user may click at (or otherwise select) a Comment Indicator 1104 to view annotations, as well as submit new annotations. Specifically, an Annotation Dialog Box 1106 is presented, which displays the annotations (or a summary of the annotations) for the corresponding variance field. The Dialog Box 1106 also displays an Input Form 1108 for the user to submit annotations. Annotations are then saved in an Annotation Table 1110. The Annotation Table 1110 may be implemented as a database such as a relational database or other suitable data structure. Exemplary data structures that may be used to store annotations will be described in further detail below with reference to FIGS. 12A-12C.

In accordance with one embodiment, the "state" of a Comment Indicator 1104 is retrieved from a Comment Locator object 1112. The Comment Locator object 1112 is created at report viewing time. The Comment Locator object 1112 accesses the Annotation Table 1110 and caches the indicator state information. When the Comment Indicator 1104 is rendered at viewing time, it consults with the Comment Locator object 1112 for its state.

The Annotations Table 1110 may be implemented using a variety of data structures, as well as using a variety of formats. FIG. 12A is an exemplary Annotations Table in which annotations may be stored. As shown in FIG. 12A, an Annotations Table 1200 may include a plurality of columns such that each row stores a single annotation. Specifically, an annotation entry may include a variance scope 1202 indicating a scope of the annotation. Specifically, the scope may identify a particular subject matter to which the annotation pertains. In addition, a period ending date 1204 identifies the last date of a period identified by a period qualifier (e.g., that is associated with a particular variance). Specifically, a period qualifier may identify the length of the period. For instance, the period qualifier may be a month, a quarter (i.e., 3 month period) or a year. In accordance with one embodiment, both the variance scope 1202 and the period ending date 1204 are used together as a key to the Annotations Table 1200. In this manner, the key may be used to identify one or more annotations entries to be provided in association with a particular variance field for which annotations are being viewed.

In addition, a particular annotation may include an identifier of an individual (e.g., author) 1206 who generated the annotation. An annotation entry 1208 is used to store the textual comments entered by the author identified in 1206. In addition, an entry date and/or time 1210 of the generation of the annotation entry 1208 may be stored.

The variance scope (VS) 1202 is the context of a particular variance. In this manner, the variance scope 1202 identifies which variance (e.g., budget or forecast variance) is being annotated. The variance scope 1202 may be numeric or alphanumeric. Moreover, the variance scope 1202 may include one or multiple identifiers or fields.

Figure 12B:
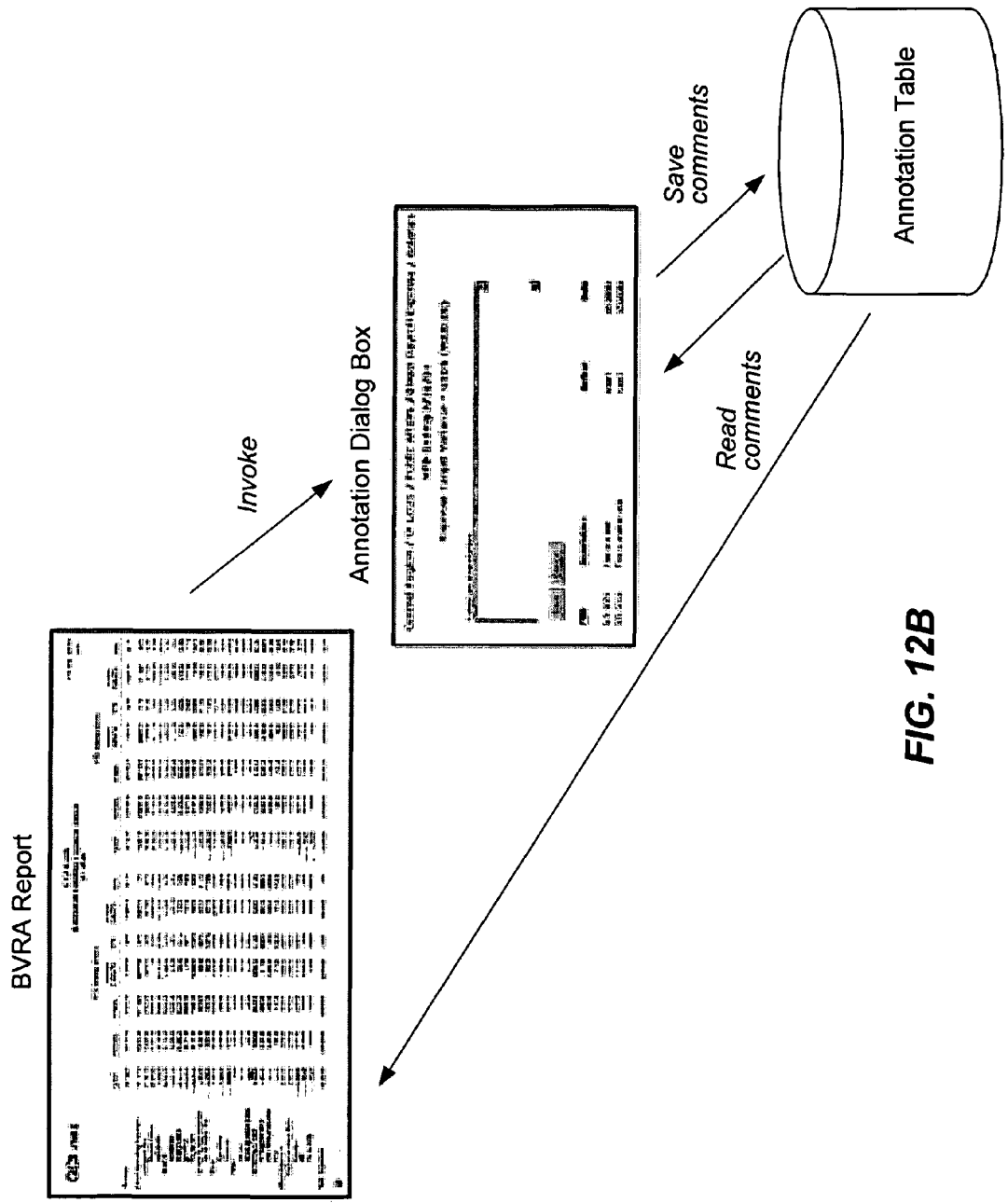
FIG. 12B is a diagram illustrating exemplary variance scopes in accordance with one embodiment of the invention.

FIG. 12B is a diagram illustrating exemplary variance scopes in accordance with one embodiment of the invention. As one example, in order to identify annotations related to a Forecast Variance field of a Division Summary report for an Expense account of a Retail Banking division, the variance scope may be identified as "Expense, Forecast Variance, Retail Banking." An identifier "VS1" may be used to identify this variance.

As another example, in order to identify annotations related to a Forecast Variance field of a Business Unit summary report for an Expense account of the Consumer Lending business unit of the Retail Banking Division, the variance scope may be identified as "Expense, Forecast Variance, Retail Banking, Consumer Lending," which may be identified by the identifier "VS2."

In this example, the identifier "VS3" is used to identify the variance scope, "Expense, Forecast Variance, Retail Banking, Consumer Lending, Direct Operating Expenses, Compensation, Regular Salary" of the Expense Detail Report. Specifically, this variance scope is used to identify the context of a Forecast Variance field of either the Direct Operation Expenses Division within the business unit Compensation for the expense account "Regular Salary" or of the Retail Banking Division within the Consumer Lending business'unit for the expense account "Regular Salary."

In the above examples, the variance scope VS3 falls under VS2 as well as VS1, while VS2 falls under only VS1. It is important to note that the above examples are illustrative only. Thus, alternative representations may be implemented to represent the hierarchical nature of the variance scopes.

FIG. 12C is a diagram illustrating an Annotations Table in which the variance scope is represented via multiple fields. Specifically, Annotations Table 1220 includes a plurality of columns substantially similar to those presented in FIG. 12A. Specifically, the Annotations Table 1220 includes the Period End Date (PED) 1204, UserID 1206 including an identifier of the author of the annotation, the annotation entry 1208 including a number of text characters, and the entry date 1210 identifying a date of entry creation as described above with reference to FIG. 12A.

In this example, the variance scope is represented by multiple fields. Specifically, the variance scope includes a variance type 1222, a division 1224, a business unit 1226, an account type 1228, and an account 1230. For instance, the variance type 1222 may be forecast or budget. The division 1224 may be any division within the organization. Similarly, the business unit 1226 may be any business unit within the organization. In this example, the account type 1228 is associated with the account for which the variance is presented. For instance, the account type 1228 may be Revenue, Expenses, or Gross Margin. Moreover, the account 1230 may be any account, such as Direct Operating Expenses, Compensation, or Salary for which a variance is being presented. In accordance with one embodiment, all of the fields 1222-1230 are combined to generate the variance scope. However, it is important to note that any field such as those represented above may also be used independently to identify a particular variance scope. It is also important to note that other types of scopes may be used to represent a scope of a field such as a variance field. For instance, a scope may identify one or more reports that are hierarchically related to one another.

Figure 13:
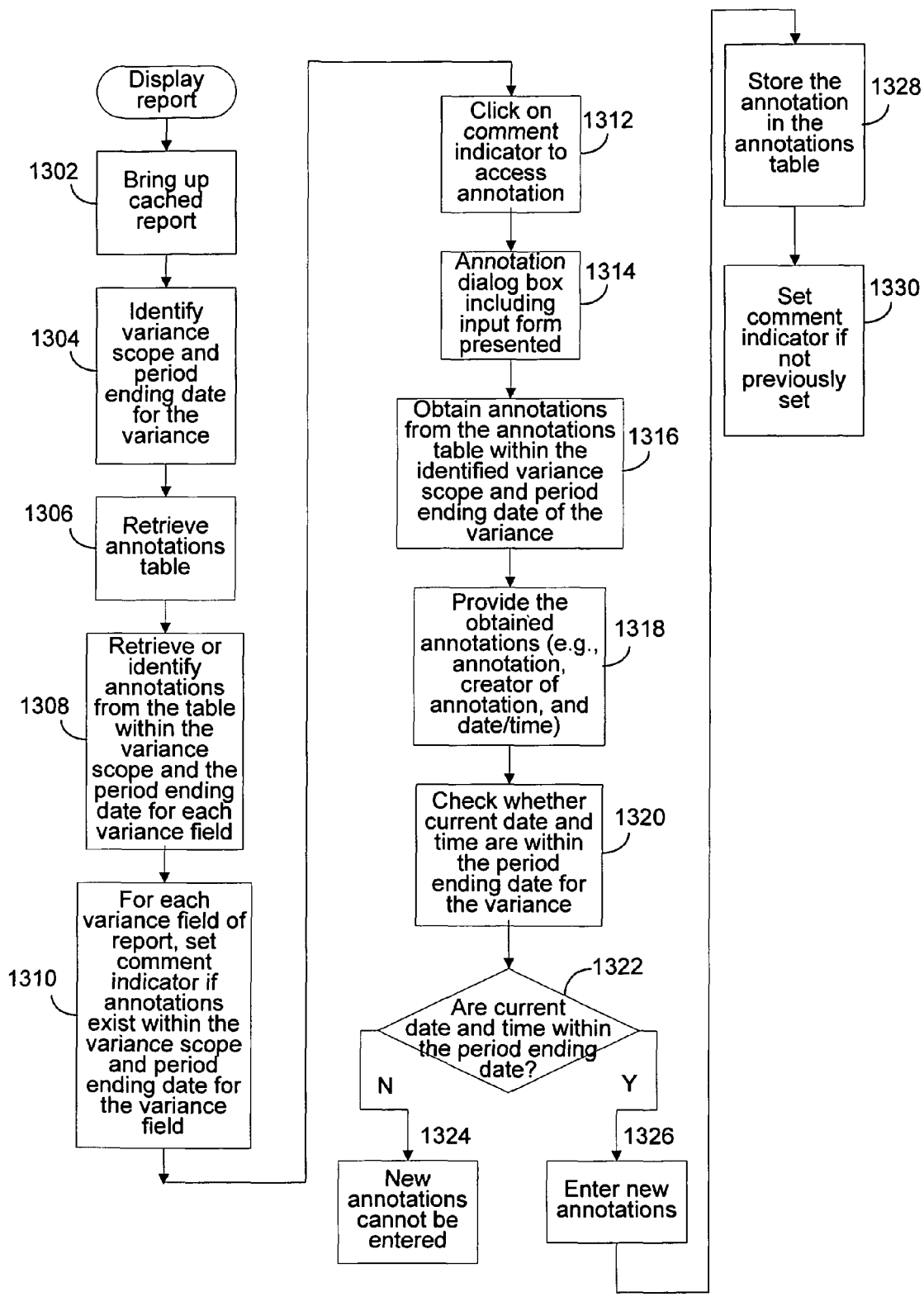
FIG. 13 is a process flow diagram illustrating a method of implementing a report annotation mechanism in accordance with one embodiment of the invention.

In accordance with various embodiments of the invention, a user may view annotations that are pertinent to a particular report (or field of the report). In addition, a user may also enter a new annotation to be stored in an Annotations Table or other suitable data structure. FIG. 13 is a process flow diagram illustrating a method of implementing a report annotation mechanism in accordance with one embodiment of the invention. When a user accesses a particular report, the report is displayed. If the report has previously been cached, the report may be obtained from the cache at 1302. Both the variance scope and period ending date for a variance field are identified at 1304. An annotations table is identified or retrieved at 1306. Both the identified variance scope and period ending date are used together as a key to the annotations table to retrieve or otherwise identify annotations from the annotations table that fall within both the variance scope and the period ending date at 1308. In this manner, annotations for each variance field of a report being viewed may be identified. For each variance field of the report, a comment indicator associated with the variance field is set if any annotations exist within the variance scope and period ending date for the variance at 1310. Specifically, the comment indicator such a triangular region may be "filled in" with a particular shading or color when the comment indicator is set.

In order to access the annotations associated with a particular variance, the user may click on the comment indicator at 1312. An annotation dialog box including an input form is then presented at 1314. Annotations within the pertinent variance scope and period ending date associated with the variance are obtained at 1316 and provided at 1318. It is important to note that the annotations associated with a particular field or element (e.g., variance) "roll up" for the hierarchy of the reports (and in association with the security of the user). In other words, annotations that are entered in association with a lower level report (e.g., within the "variance scope") and within the period end date are presented to a user viewing the higher level report, not solely the annotations associated with the period end date or scope of the report being viewed. Accordingly, since the annotations are not associated with any one report, a user having access rights to a particular report may view all annotations that are pertinent to the report being viewed and the variance being analyzed.

It may be desirable to prevent a user from entering new annotations for a particular variance if the current date is after the period ending date of the variance. Thus, as shown at 1320, it is determined whether the current date (and optionally time) is within the period ending date for the variance. If the current date (and time) are not within the period ending date at 1322, the user is not permitted to enter new annotations. However, if the current date is within the period ending date, the user may enter a new annotation in the input form of the annotation dialog box at 1326. The new annotation is then stored in the annotations table at 1328. The comment indicator is then set if it has not been previously set at 1330.

Alternatively, it may be desirable to enable a user to enter new annotations for a particular variance, even if the current date is after the period ending date of the variance. This may be desirable under a variety of circumstances. For instance, a business manager may become aware of new information that has effected a particular variance after the period ending date. It may therefore be beneficial to enable the business manager to document his or her findings at this time.

An exemplary application of the described embodiments will be described below with reference to FIGS. 14-32. FIG. 14 illustrates an exemplary Expense Detail Report. Specifically, as shown in FIG. 14, a user clicks on the forecast variance field or associated comment indicator for the Commercial Lending Expense detail for Office Phones. Since the comment indicator has not been filled in, an indication that there are no annotations for this variance and period is presented to the user. In addition, an input form is presented to the user, enabling the user to enter new annotations in association with the variance.

Figure 15:
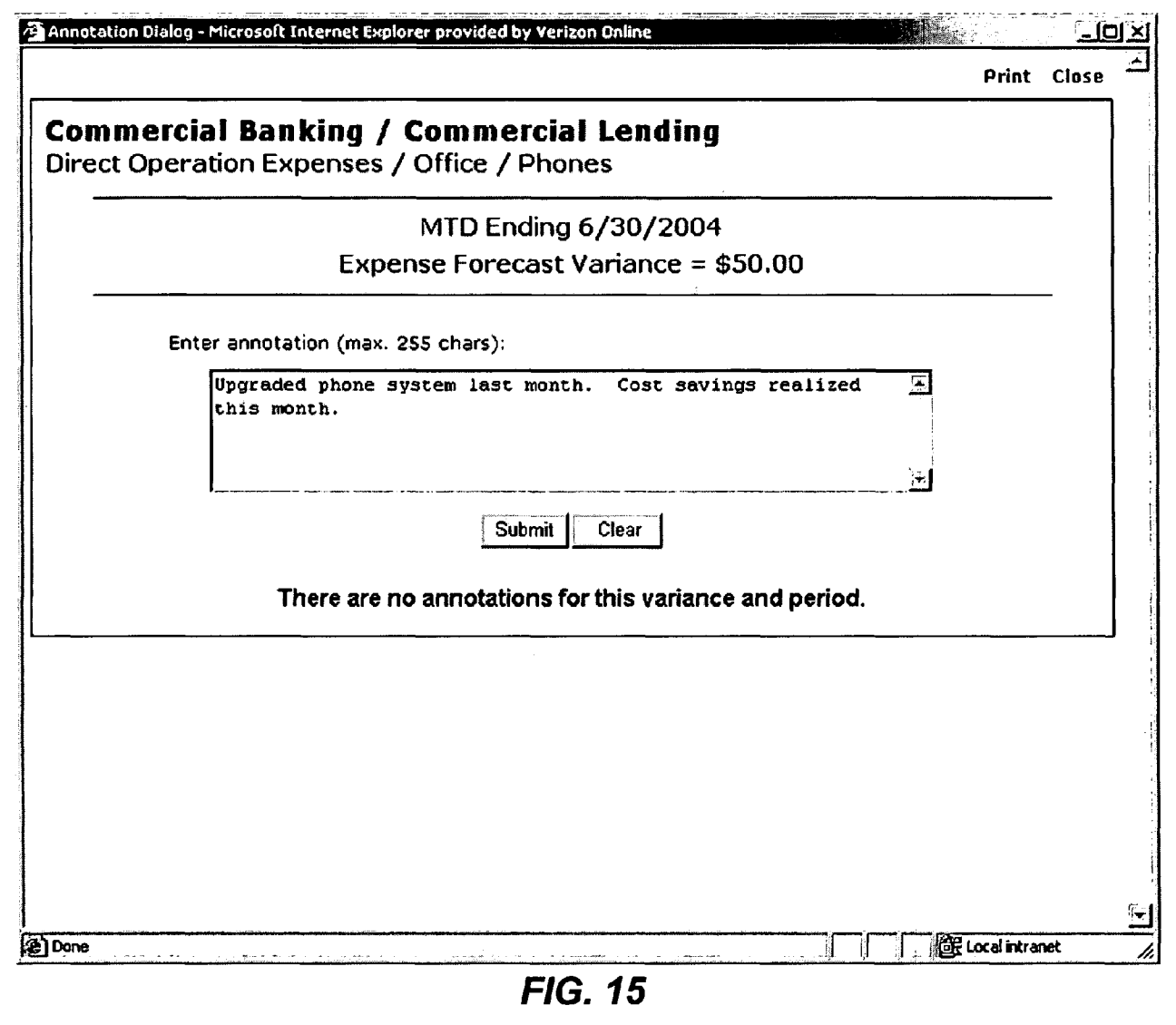
Figure 16:
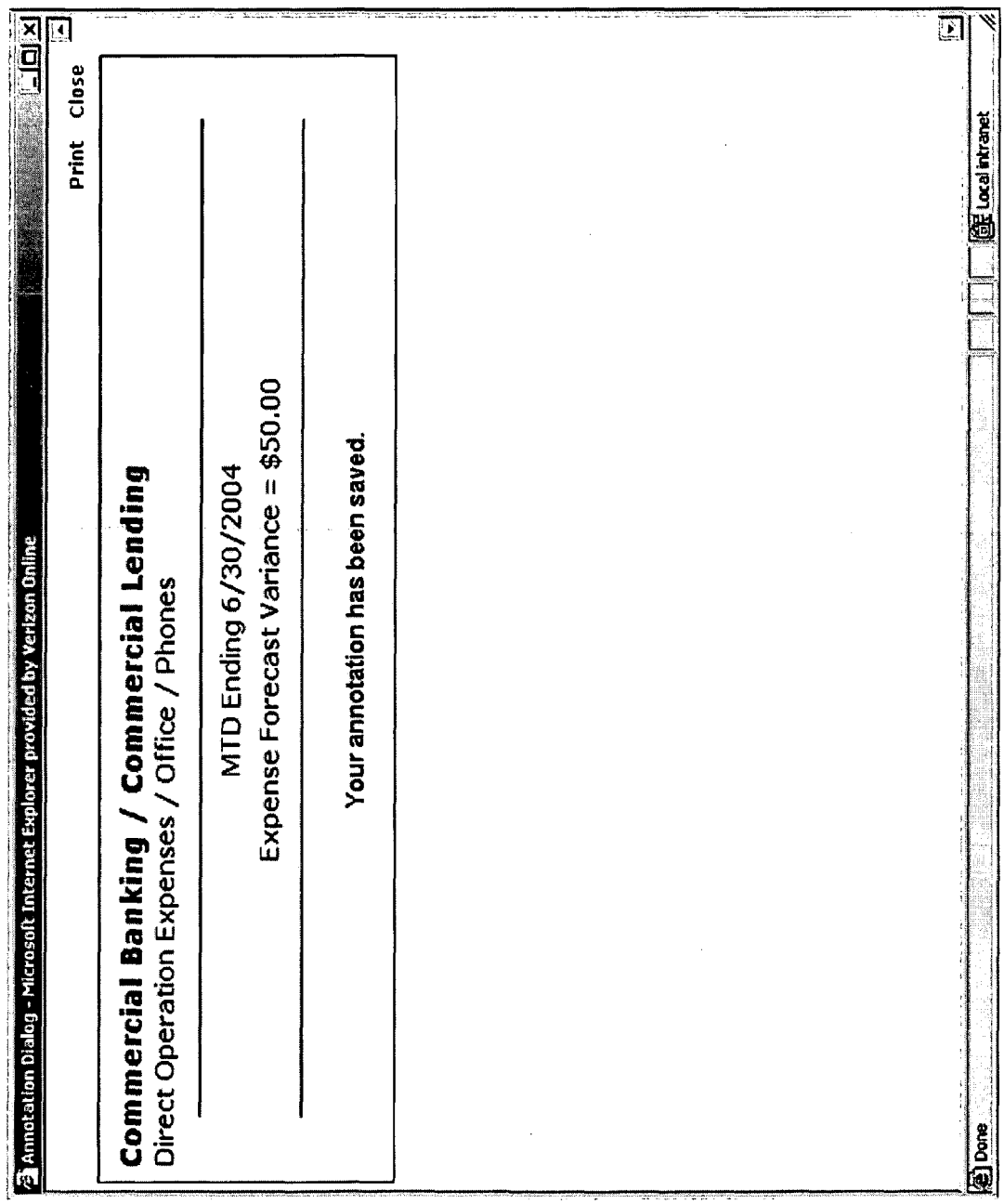
FIG. 16 is a confirmation message indicating that an annotation has been saved.

The user enters a new annotation in the input form of the dialog box presented in FIG. 15. The user may then click the Submit button to submit and store the newly entered annotation. The newly submitted annotation will then be stored in the Annotations Table. As shown in FIG. 16, a confirmation message indicating that the annotation has been saved is presented to the user. FIG. 17 illustrates the Expense Detail Report of FIG. 14 after the new annotation entered in FIG. 15 has been saved. As shown, the comment indicator associated with the Forecast Variance for the Office Phones expense has now been set.

By clicking on the comment indicator that has been set, an annotation dialog box including an input form is presented as shown in FIG. 18. As shown, the dialog box now includes the newly added annotation. The entire annotation or a summary thereof may be presented, as shown. Accordingly, the recently added comments are now displayed in the dialog box.

Figure 19:
FIG. 19 is a diagram illustrating a comment indicator associated with a Budget Variance field for the Office Phones expense via which a user may enter or access comments.
Figure 20:
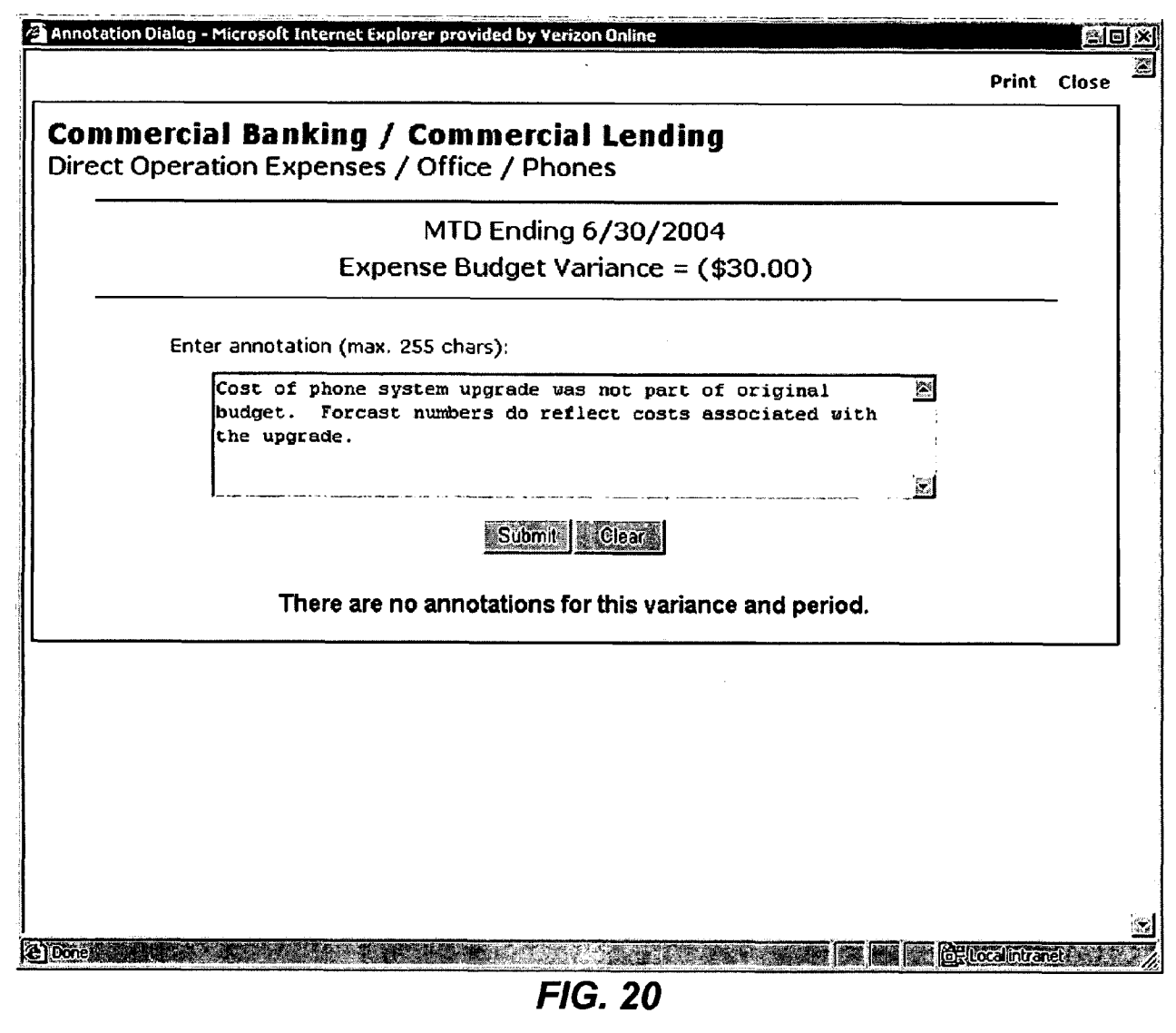

As another example, within the same report, the user clicks on another variance field or associated comment indicator. Specifically, the user clicks on the comment indicator associated with the Budget Variance field for the Office Phones expense, as shown in FIG. 19. Since there are no annotations associated with the Budget Variance for the Office Phones expense, the comment indicator is not set. Since there are no annotations associated with this variance, when the user clicks on the empty triangle, a dialog box is displayed to the user. In the dialog box, an indication that there are no annotations for this variance and period is presented to the user. In addition, an input form is presented to the user, enabling the user to enter a new annotation. FIG. 20 illustrates the result of a user inputting text into the dialog box prior to clicking "Submit."

Figure 21:
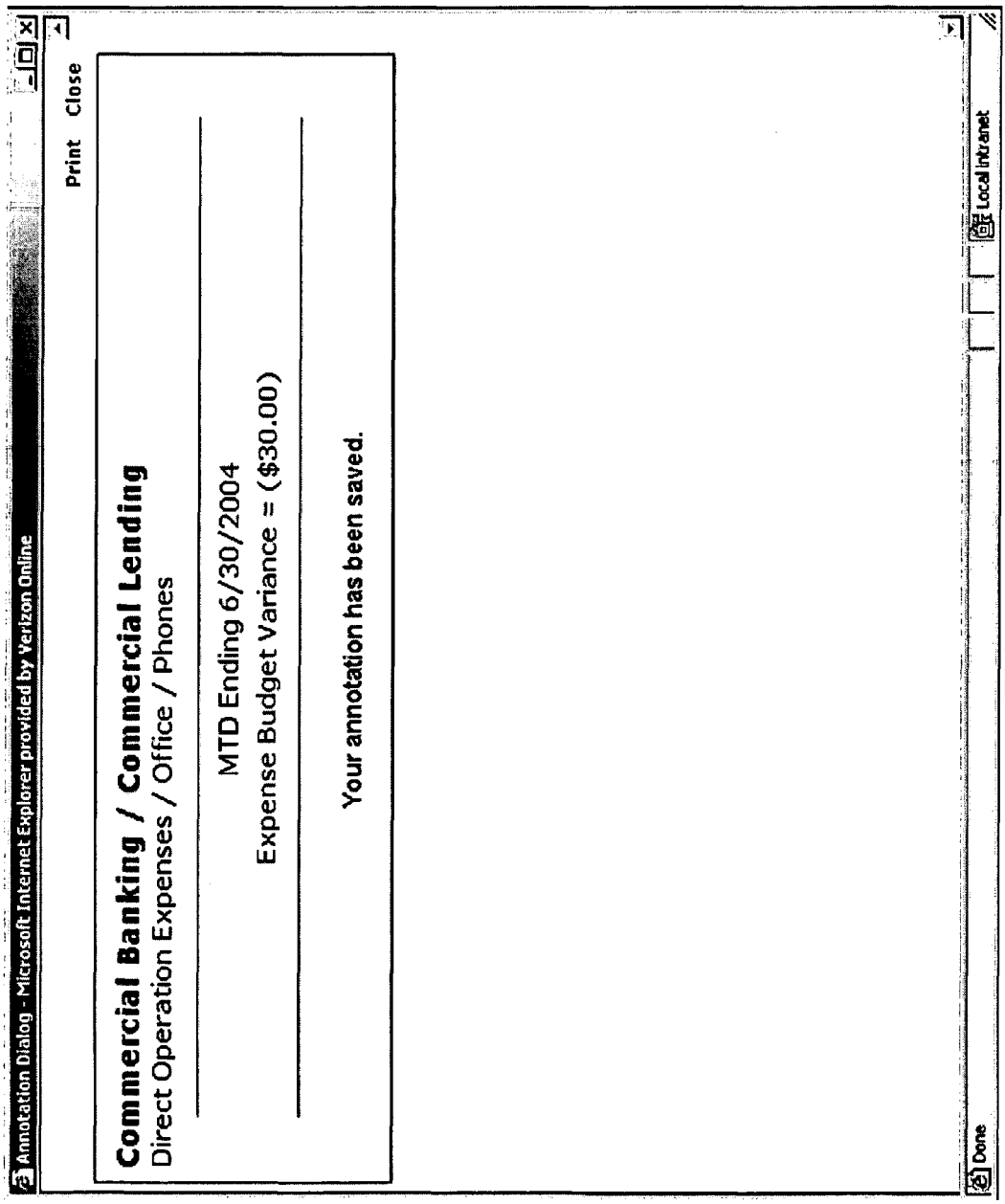
FIG. 21 is an annotation save confirmation message presented to the user once the user clicks on the "Submit" button.

Once the user clicks on the "Submit" button, an annotation save confirmation message is presented to the user as shown in FIG. 21. Now that the newly entered annotation has been saved, the appropriate comment indicator in the report being viewed is set (e.g., filled in) as shown in FIG. 22. For instance, the previously empty triangle may be filled in with a particular color (e.g., yellow).

When the user clicks on the comment indicator that was previously set after the expense forecast variance annotation was input in FIG. 15, an annotation dialog box is presented as shown in FIG. 23. As shown in FIG. 23, the annotation that was previously entered in FIG. 20 is now displayed in the dialog box, which results from clicking on the yellow triangle at the intersection of the Phones category and budget variance as displayed in FIG. 22.

We now turn to a Business Unit Summary Report, as shown in FIG. 24. Since an Expense Detail report such as that presented above with reference to FIGS. 14-23 is a lower level report than the Business Unit Summary Report, all annotations entered in association with a Budget or Forecast variance in the Expense Detail report will be presented to a user viewing annotations associated with a Budget or Forecast variance of the Business Unit Summary Report. Stated another way, all annotations within the variance scope of the corresponding variance fields of the Business Unit Summary Report will be presented to a user. Since the variance scope of these fields includes the variance scope of the corresponding fields of the Expense Detail Report, the annotations entered in association with the variance fields of the Expense Detail Report will be presented to a user viewing the Business Unit Summary Report.

It is important to note that this Business Unit Summary Report is the same report as that presented previously with reference to FIG. 5 at a later point in time. As shown in FIG. 5, a comment indicator was set in association with the Forecast Variance with a Month-To-Date Ending Jun. 30, 2004. However, a comment indicator was not set in association with the Budget Variance for this same period ending date. However, in the lower level Expense Detail Report, we recently entered an annotation for the Budget Variance field in FIG. 20. Since comments "roll up" in the hierarchy of report templates, the comment indicator for the higher level Business Unit Summary Report is now set.

As set forth above, the comment indicator for the Forecast Variance field was already set in the Expense Detail report shown in FIG. 5. Similarly, an additional annotation was recently entered for the Forecast Variance field of the Expense Detail Report in FIG. 15. Thus, there should now be two comments that are presented in association with the Expense Forecast Variance of FIG. 24.

When the user clicks on the comment indicator associated with the Expense Forecast Variance Field of the Business Unit Summary Report of FIG. 24, an annotation dialog input box is presented as shown in FIG. 25 including both annotations that have previously been entered. Specifically, both comments "roll up" to the Business Unit Summary report from the Expense Detail report.

Similarly, when the user clicks on the comment indicator associated with the Expense Budget Variance field of the Business Unit Summary Report of FIG. 24, an annotation dialog input box is presented as shown in FIG. 26 including the annotation that was recently entered for the Forecast Variance field of the Expense Detail Report in FIG. 15. Thus, the recently entered annotation "rolls up" from the Expense Detail Report to the Expense Budget Variance field of the Business Unit Summary Report.

Figure 27:
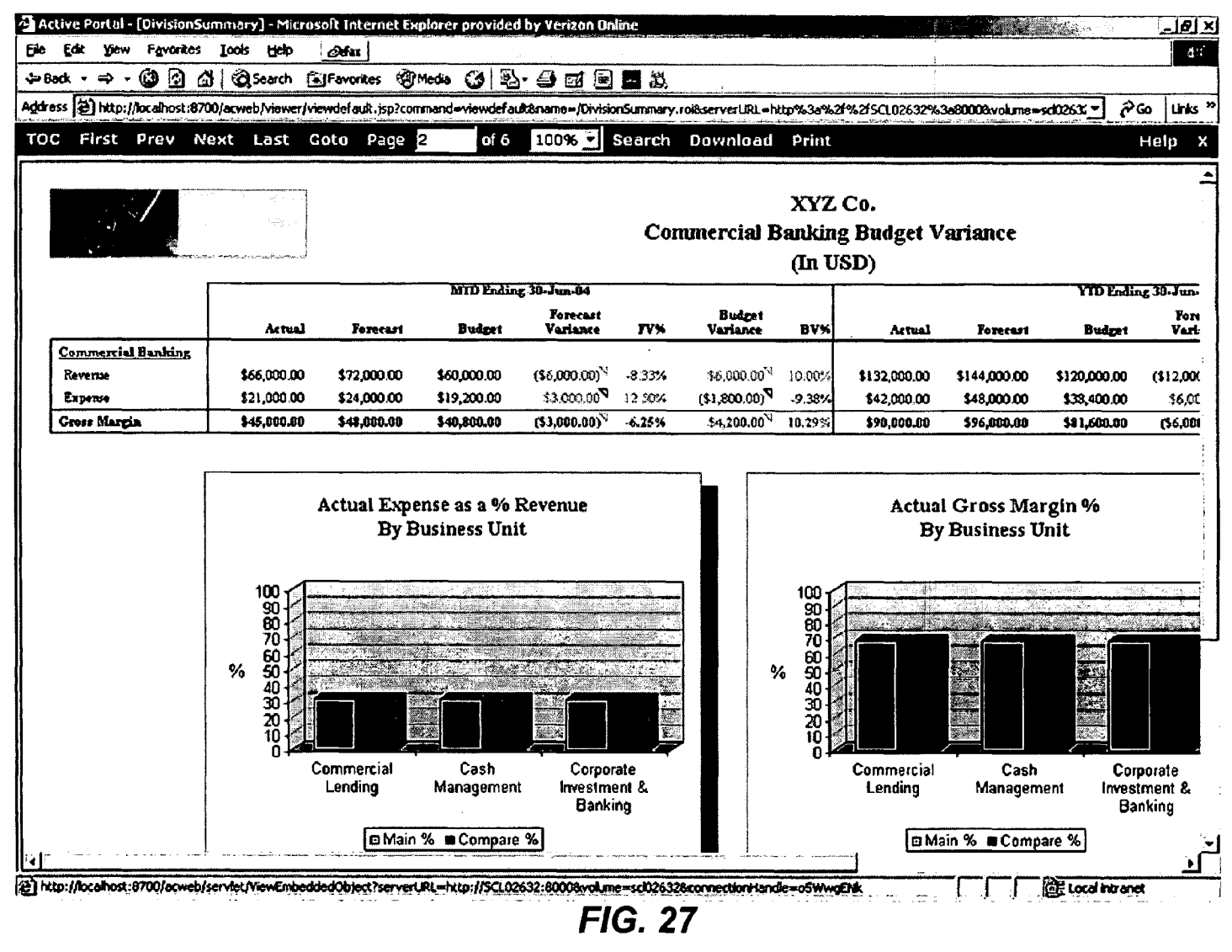

FIG. 27 is a screen shot illustrating a Division Summary Report. It is important to note that this Division Summary Report is the same report as that presented previously with reference to FIG. 4 at a later point in time. As shown in FIG. 4, the comment indicator associated with Budget Variance field for the Month-To-Date ending Jun. 30, 2004 was not set, while the comment indicator associated with the Forecast Variance field for the Month-To-Date ending Jun. 30, 2004 was set. As shown in FIG. 27, the comment indicator for the Budget Variance field is now set. Since we recently added an annotation for the Budget Variance field of the Expense Detail Report in FIG. 20, this annotation "rolls up" to the Division Summary report. In addition, since we recently added an annotation for the Forecast Variance field of the Expense Detail Report in FIG. 15, there will be more than one annotation in association with the Forecast Variance field of the Division Summary Report.

When the user clicks on the comment indicator associated with the Expense Forecast Variance field, a dialog box is presented as shown in FIG. 28. Specifically, the two annotations entered in association with the Expense Detail Report "roll up" to the Division Unit Summary report. In addition, the annotation previously added for the Forecast Variance field of the Division Unit Summary Report is also presented.

When the user clicks on the comment indicator associated with the Expense Budget Variance field, a dialog box is presented as shown in FIG. 29. Specifically, the annotation recently added for the Budget Variance field of the Expense Detail Report in FIG. 20 "rolls up" to the Division Summary Report. Thus, annotations added to a lower level report such as an Expense Detail Report "rolls up" to a higher level report such as a Division Unit Summary Report.

Figure 30:
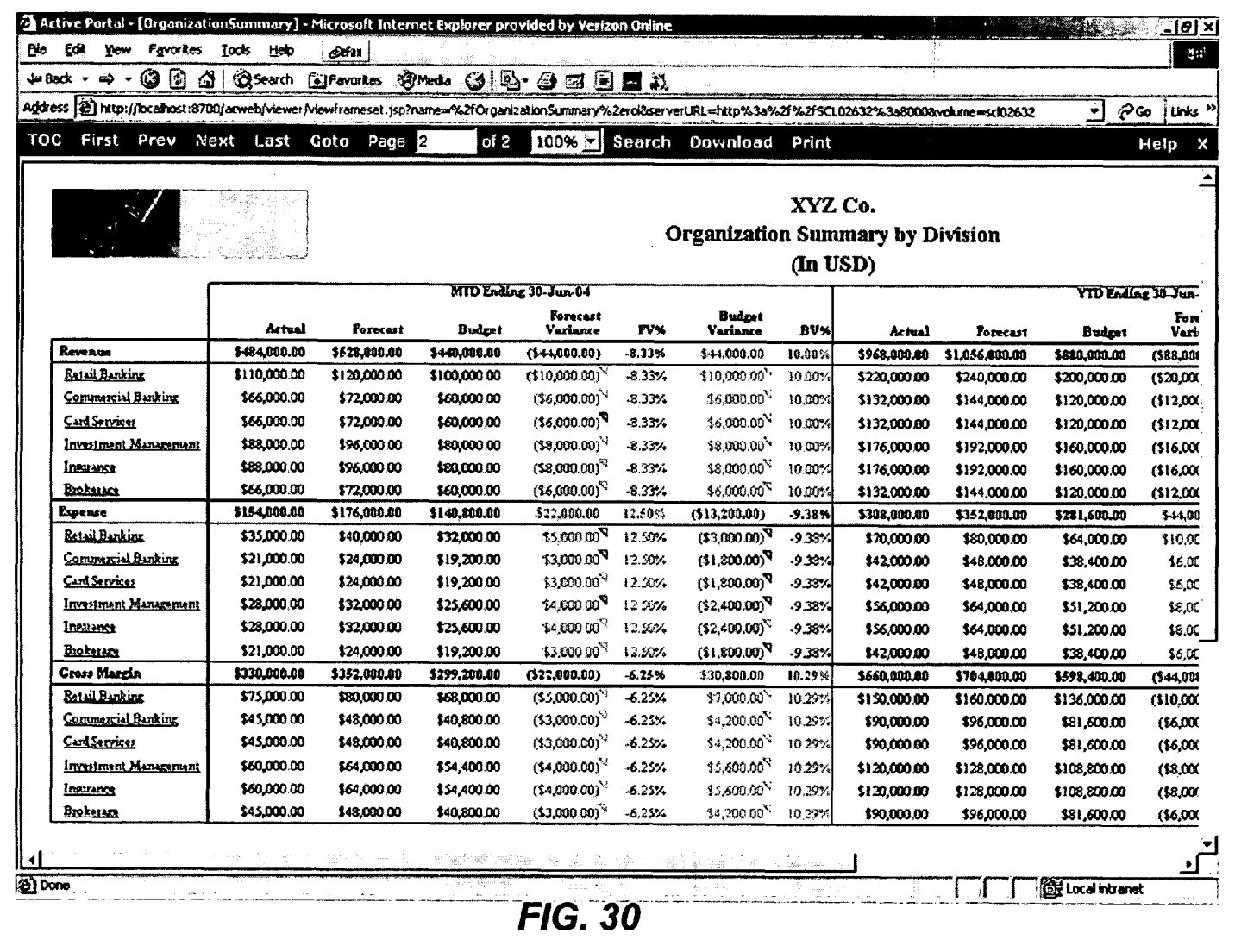

FIG. 30 illustrates an Organization Summary Report. It is important to note that this Organization Summary Report is the same report as that presented in FIG. 3 at a later point in time. As previously shown in FIG. 3, the comment indicator associated with Forecast Variance field for the Commercial Banking division of the Organization Summary Report was set, while the comment indicator associated with the Budget Variance field for the Commercial Banking division of the Organization Summary Report was not set. However, in FIG. 30, both the comment indicators are now set. Thus, the annotation added in FIG. 15 in association with the Forecast Variance field of the Expense Detail Report is not the only annotation under this node. However, the annotation added in FIG. 20 in association with the Budget Variance field of the Expense Detail Report rolls up to the Organization Summary Report, and should now be the only annotation under this node.

When the user clicks on the comment indicator associated with the Forecast Variance field of the Expense account of the Commercial Banking Division shown in FIG. 30, the user is presented with the dialog box as shown in FIG. 31. As shown, the annotations shown in the Division Summary Report of FIG. 28 roll up to the Organization Summary Report.

When the user clicks on the comment indicator associated with the Budget Variance field of the Expense account of the Commercial Banking Division shown in FIG. 30, the user is presented the dialog box shown in FIG. 32. As shown, the annotation added in FIG. 20 is the only annotation that rolls up to the Organization Summary Report. This explains the change in the status of the comment indicator for this particular variance field from the status as shown in FIG. 3.

The manipulations of data described herein are often referred to in terms, such as storing, providing, or generating. In any of the operations described herein that form part of the present invention, these operations are machine operations. Useful machines for performing the operations of the present invention include general-purpose digital computers, networks of such computers, or other programmable systems. In all cases, there is a distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer or network of computers selectively activated or reconfigured by a computer program stored on a machine readable medium. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given below.

Still further, the present invention relates to machine-readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

A preferred computer system invention includes a server and one or more clients. In preferred embodiments, software providing the disclosed functionality is provided on the server and can be accessed through the various clients. The server in accordance with the present invention includes a central processing unit (CPU), input/output (I/O) circuitry, and memory—which may be read only memory (ROM) and/or random access memory (RAM). The server may also optionally include a display, a mass storage unit, a keyboard, and a clock.

In one embodiment, the CPU is preferably one or more microprocessor chips selected from complex instruction set computer (CISC) microprocessors, reduced instruction set computer (RISC) microprocessors, or other available microprocessors. The CPU is coupled to a memory by a bi-directional data bus, but may also be coupled by a unidirectional data bus in the case of ROM. The memory is also coupled to the CPU by appropriate control and address busses, as is well known to those skilled in the art.

The CPU is coupled to the I/O circuitry by a bi-directional data bus to permit data transfers with peripheral devices. I/O circuitry preferably includes a number of latches, registers and direct memory access (DMA) controllers. The purpose of the I/O circuitry is to provide an interface between CPU and such peripheral devices as display assembly, mass storage (e.g., disks), keyboard, and clients. The display assembly of server receives data from the I/O circuitry via the bus and displays that data on a suitable screen. Mass storage can be coupled to I/O circuitry by a bi-directional data bus. Generally, mass storage will be a hard disk drive, a tape drive, or some other long-term storage device. It may be used to store report templates (e.g., template objects) of this invention, programs for accessing or generating such report templates, programs for viewing such report templates, and programs for generating a report from such report templates.

The keyboard communicates with the CPU via data bus and I/O circuitry. In addition to keyboard, other types of input device can also be used in conjunction with the present invention. For example, a computer mouse, a track ball, a track pad, or a pen-based tablet can be used to manipulate a pointer on display screen. A clock preferably comprises a real-time clock to provide real-time information to the system. Alternatively, the clock can simply provide regular pulses to, for example, an interrupt port of the CPU, which can count the pulses to provide the time function. The clock is coupled to the CPU by a data bus.

The clients may include terminals, personal computers, workstations, minicomputers, and mainframes. For purposes of this invention, any data processing devices which can access the report templates (e.g., report objects) or report template generating software on server are clients. It should be understood that the clients may be manufactured by different vendors and may also run different operating systems such as MS-DOS, Microsoft Windows, Microsoft NT, various forms of UNIX, OS/2, MAC OS and others. Clients are connected to I/O circuitry via bi-directional lines. Bidirectional lines may be any suitable media such as coaxial cable, twisted pair wiring, fiber optic line, radio channels, and the like. Further, the network resulting from the interconnection of the lines may assume a variety of topologies, including ring, bus, star, and may include a collection of smaller networks linked by gateways and bridges. As with the clients, it should be understood that the server may run different operating systems such as MS-DOS, Microsoft Windows, Microsoft NT, UNIX, VMS, OS/2, MAC OS and others. The clients need not use the same operating system as the server.

It is also within the scope of this invention to implement the apparatus and methods for generating, storing, viewing, and accessing report templates and report template objects on a "stand-alone" computer that does not form part of a network.

Although the foregoing invention has been described in some detail for purposes of clarity of understanding, it will be apparent that certain changes and modifications may be practiced within the scope of the appended claims. For instance, although the specification has described an example employing data structures used to store and retrieve annotations, different types of data structures may be used as well. Moreover, the report that accesses these annotations may be any type of report, and therefore need not be a spreadsheet report. In addition, the reader will understand that the specific methods described herein are illustrative only. Thus, the methods, apparatus, and data structures for storing or accessing annotations as disclosed herein may be implemented with other types of data structures or methods and their equivalents.

What is claimed is:

1. A method of storing annotations accessible by a plurality of reports, comprising:

obtaining an annotation in association with a data element or field of one of the plurality of reports, the annotation including comments entered by an author; and storing the annotation;

wherein the stored annotation is associated with a scope of the annotation and a period end date of the annotation;

wherein the scope indicates a subject matter with which the annotation is associated;

wherein both the scope and the period end date are used together to access as a key for accessing the annotation; for one of the plurality of reports via which the annotation was obtained, wherein the annotation is accessible by each of the plurality of reports having a scope equal to the scope of the annotation or including the scope of the annotation, and having a period end date equal to the period end date of the annotation or greater than the period end date of the annotation.

2. The method as recited in claim 1, wherein the scope of the annotation is a scope of the data element or field and the period end date is a period end date of the data element or field.

3. The method as recited in claim 1, wherein the scope of the annotation is a scope of the report and the period end date is a period end date of the report.

4. The method as recited in claim 1, wherein the plurality of reports are related in a hierarchical manner.

5. The method as recited in claim 1, wherein the scope identifies a scope of the plurality of reports.

6. The method as recited in claim 1, wherein the scope identifies the plurality of reports.

7. The method as recited in claim 1, wherein the scope indicates at least one of a variance type and an account type.

8. The method as recited in claim 1, wherein the scope indicates at least one of a division, a business unit, and an account.

9. The method as recited in claim 1, wherein the annotation has an entry date associated therewith.

10. The method as recited in claim 9, wherein the entry date can be outside the period end date.

11. The method as recited in claim 1, wherein the scope of the annotation is a scope of the field and the period end date of the annotation is a period end date of the field.

12. The method as recited in claim 1, wherein the field is present in each of the plurality of reports.

13. The method as recited in claim 1, further comprising:
   storing the scope of the annotation; and
   storing the period end date of the annotation.

14. The method as recited in claim 1, wherein the annotation has an annotation time associated therewith.

15. The method as recited in claim 1, wherein the field is a variance field, the scope is a variance scope indicating a scope of variance and wherein the comments are associated with the variance.

16. The method as recited in claim 15, wherein the variance is a budget variance.

17. The method as recited in claim 15, wherein the variance is a difference between a budget amount and a forecasted amount.

18. The method as recited in claim 15, wherein the variance is a difference between a budget amount and an actual amount.

19. The method as recited in claim 1, wherein the scope is one of a plurality of scopes, the plurality of scopes being related in a hierarchical manner.

20. A method of storing annotations accessible by a plurality of reports, comprising:

receiving an annotation in association with a variance of one of the plurality of reports, the annotation including comments entered by an author; and storing the annotation;

wherein the stored annotation is associated with a scope of the variance and a period end date of the variance;

wherein the scope of the variance indicates a subject matter with which the variance is associated; and wherein both the scope and the period end date are used together as a key for accessing the annotation;

wherein the annotation is accessible by each of the plurality of reports having a scope that is equal to the scope of the annotation or including the scope of the annotation, and having a period end date equal to the period end date of the annotation or greater than the period end date of the annotation.

21. The method as recited in claim 20, wherein the variance is a forecast or budget variance.

22. The method as recited in claim 20, wherein the scope is represented by a plurality of fields.

23. The method as recited in claim 20, wherein the subject matter indicates a business group with which the plurality of reports are associated.

24. The method as recited in claim 23, wherein the plurality of reports are related in a hierarchical manner.

25. The method as recited in claim 24, wherein each of the plurality of reports has a scope equal to the scope of the annotation or including the scope of the annotation, and has a period end date equal to the period end date of the annotation or greater than the period end date of the annotation, thereby enabling the annotation to be accessible via the plurality of reports.

26. The method as recited in claim 25, wherein each of the plurality of reports has a variance with a scope equal to the scope of the annotation or including the scope of the annotation.

27. The method as recited in claim 20, wherein each of the plurality of reports is a summary report or expense report.

28. The method as recited in claim 27, wherein the annotation is not associated with the plurality of reports.

29. The method as recited in claim 20, wherein the annotation is accessible by each of the plurality of reports having a variance with a scope that is equal to the scope of the annotation or including the scope of the annotation, and having a variance with a period end date equal to the period end date of the annotation or greater than the period end date of the annotation.

30. A method of viewing annotations in association with a field of one of a plurality of reports, comprising:

receiving a request to view annotations in association with a field of one of the plurality of reports or a request to view the one of the plurality of reports;

ascertaining a scope of the field of the one of the plurality of reports and a period end date of the field of the one of the plurality of reports;

identifying one or more annotations from a plurality of annotations using a key, wherein both the scope and the period end date are used together as the key; and displaying the identified annotations, wherein the scope of the field of the one of the plurality of reports is equal to or greater than the scope of the identified annotations and wherein the period end date of the field of the one of the plurality of reports is later than or equal to the period end date of the identified annotations.

31. The method as recited in claim 30, wherein identifying one or more annotations comprises:

identifying one or more annotations in an annotations database storing annotations for the plurality of reports, wherein the scope of the field and the period end date of the field are used together as a key to the annotations database.

32. The method as recited in claim 30, wherein the field is a variance field and where displaying is performed in association with the variance field of the one of the plurality of reports.

33. The method as recited in claim 32, further comprising:

displaying a comment indicator in association with the variance field when the scope of the one of the plurality of reports is equal to or greater than the scope of one or more annotations and when the period end date of the one of the plurality of reports is later than or equal to the period end date of one or more annotations associated with the variance field.

34. The method as recited in claim 33, further comprising:

receiving a request to view annotations associated with the variance field.

35. The method as recited in claim 34, further comprising:

determining whether the comment indicator is set; and when the comment indicator is set, displaying the one or more annotations when the scope of the one of the plurality of reports is equal to or greater than the scope of the one or more annotations and when the period end date of the one of the plurality of reports is later than or equal to the period end date of the one or more annotations.

36. The method as recited in claim 30, wherein when the scope of the one of the plurality of reports is equal to or greater than the scope of annotation and when the period end date of the one of the plurality of reports is later than or equal to the period end date of the annotation, receiving and storing a new annotation.

37. The method as recited in claim 30, wherein wherein the request is received from an individual;

determining whether the individual has security access to the one of the plurality of reports; and when it is determined that the individual has security access to the one of the plurality of reports, performing the determining, ascertaining and displaying steps.

38. The method as recited in claim 30, wherein each of the plurality of the annotations is accessible via each of the plurality of reports having a scope equal to the scope of the annotation or including the scope of the annotation, and having a period end date equal to the period end date of the annotation or greater than the period end date of the annotation.

39. The method as recited in claim 30, wherein at least a portion of the plurality of annotations was entered in association with a different one of the plurality of reports.

40. The method as recited in claim 30, wherein the plurality of annotations have been entered in association with one or more of the plurality of reports, and wherein the plurality of annotations are accessible via the plurality of reports.

41. At least one non-transitory computer-readable medium storing thereon computer-readable instructions that, when executed by a processor, cause the processor to perform the following steps:

obtaining an annotation in association with a data element or field of one of a plurality of reports, the annotation including comments entered by an author; and storing the annotation;

wherein the stored annotation is associated with a scope of the annotation and a period end date of the annotation;

wherein the scope indicates a subject matter with which the annotation is associated; and wherein the annotation is accessible via each of the plurality of reports having a scope equal to the scope of the annotation or including the scope of the annotation, and having a period end date equal to the period end date of the annotation or greater than the period end date of the annotation.

42. The non-transitory computer-readable medium as recited in claim 41, wherein both the scope and the period end date are used together as a key for accessing annotations.

43. The non-transitory computer-readable medium as recited in claim 41, wherein the scope of the annotation is a scope of the one of the plurality of reports and the period end date of the annotation is a period end date of the one of the plurality of reports.

44. At least one non-transitory computer-readable medium storing thereon computer-readable instructions that, when executed by a processor, cause the processor to perform the following steps:

receiving a request to view annotations in association with a field of one of a plurality of reports or a request to view the one of the plurality of reports;

ascertaining a scope of the one of the plurality of reports and a period end date of the one of the plurality of reports;

identifying one or more annotations from a plurality of annotations using a key, wherein both the scope and the period end date are used together as the key, wherein the scope of the one of the plurality of reports is equal to or greater than the scope of the identified annotations and wherein the period end date of the one of the plurality of reports is later than or equal to the period end date of the identified annotations; and displaying the identified annotations.

45. The non-transitory computer-readable medium as recited in claim 44, wherein the plurality of annotations have been entered in association with one or more of the plurality of reports, and wherein the plurality of annotations are accessible via the plurality of reports.

46. The non-transitory computer-readable medium as recited in claim 45, wherein the key does not identify the one of the plurality of reports, thereby enabling annotations that have been entered in association with other ones of the plurality of reports to be accessed via the one of the plurality of reports.

* * * * *